US010625651B1

(12) United States Patent
Hicks et al.

(10) Patent No.: US 10,625,651 B1
(45) Date of Patent: Apr. 21, 2020

(54) END DUMP TRAILER AND MODULAR EXTRUSIONS THEREFOR

(71) Applicant: Hicks Manufacturing LLC, Minden, LA (US)

(72) Inventors: Gregory L. Hicks, Carolina Beach, NC (US); DeWayne B. Williams, Minden, LA (US); John McKenney, Ranchos de Taos, NM (US)

(73) Assignee: HICKS MANUFACTURING LLC, Minden, LA (US)

(*) Notice: Subject to any disclaimer, the term of this patent is extended or adjusted under 35 U.S.C. 154(b) by 170 days.

(21) Appl. No.: 15/916,004

(22) Filed: Mar. 8, 2018

Related U.S. Application Data

(60) Provisional application No. 62/468,916, filed on Mar. 8, 2017.

(51) Int. Cl.
*B60P 1/28* (2006.01)
*B60P 1/16* (2006.01)

(52) U.S. Cl.
CPC ............ *B60P 1/286* (2013.01); *B60P 1/16* (2013.01); *B60P 1/28* (2013.01); *B60P 1/283* (2013.01)

(58) Field of Classification Search
CPC .. B60P 1/286; B60P 1/283; B60P 1/28; B60P 1/16; B62D 65/024; B62D 29/008
USPC ................... 298/22 R, 22 P, 17 R; 296/183.2
See application file for complete search history.

(56) References Cited

U.S. PATENT DOCUMENTS

| 2,910,322 | A | * | 10/1959 | Magor | B60P 1/286 296/183.1 |
|---|---|---|---|---|---|
| 3,814,479 | A | | 6/1974 | Vornberger | |
| 4,660,843 | A | | 4/1987 | Hicks | |
| 5,354,165 | A | | 10/1994 | Booher | |
| 6,505,891 | B1 | | 1/2003 | Hickey | |
| 6,612,643 | B1 | | 9/2003 | McWilliams | |
| 6,719,360 | B1 | | 4/2004 | Backs | |
| 7,100,972 | B2 | | 9/2006 | Booher | |
| 7,338,111 | B2 | | 3/2008 | Lemmons | |
| 7,407,217 | B2 | | 8/2008 | Compaan | |
| 8,303,044 | B2 | | 11/2012 | Obermeyer | |
| 8,550,542 | B1 | | 10/2013 | Booher et al. | |
| 2009/0085394 | A1 | | 4/2009 | Lemmons | |
| 2012/0086185 | A1 | * | 4/2012 | Kerr | B60P 1/28 298/17 R |

OTHER PUBLICATIONS

Alcoa Fastening Systems, Magna-Lok® The World's Most Reliable Blind Fastening System; Copyright 2013.
Alcoa Fastening Systems, BobTail® The Next Generation Small Diameter HuckBolt®; Copyright 2014.

* cited by examiner

*Primary Examiner* — Stephen T Gordon

(57) ABSTRACT

A dump body for a dump trailer or a dump truck comprises modular components of tempered aluminum alloy joined together with mechanical fasteners to form modular subassemblies. Welding or other high-temperature joining processes are not required for fabrication of the dump body, and thus the full strength of the tempered aluminum alloy is retained. Methods for assembly of the modular components to form the modular subassemblies and for assembly of the modular subassemblies to form the dump body using mechanical fasteners are provided in addition to designs for modular components and modular subassemblies.

17 Claims, 20 Drawing Sheets

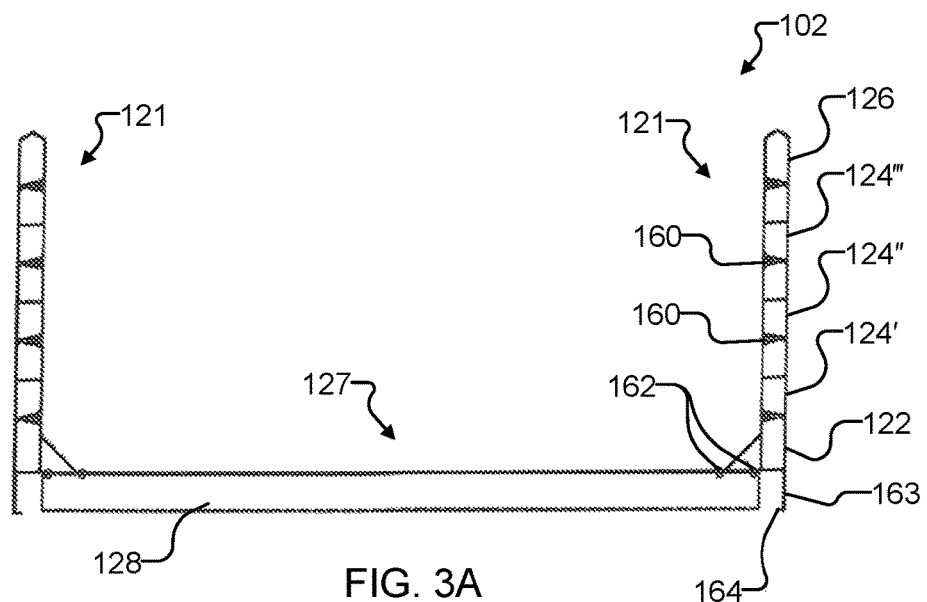
FIG. 3A
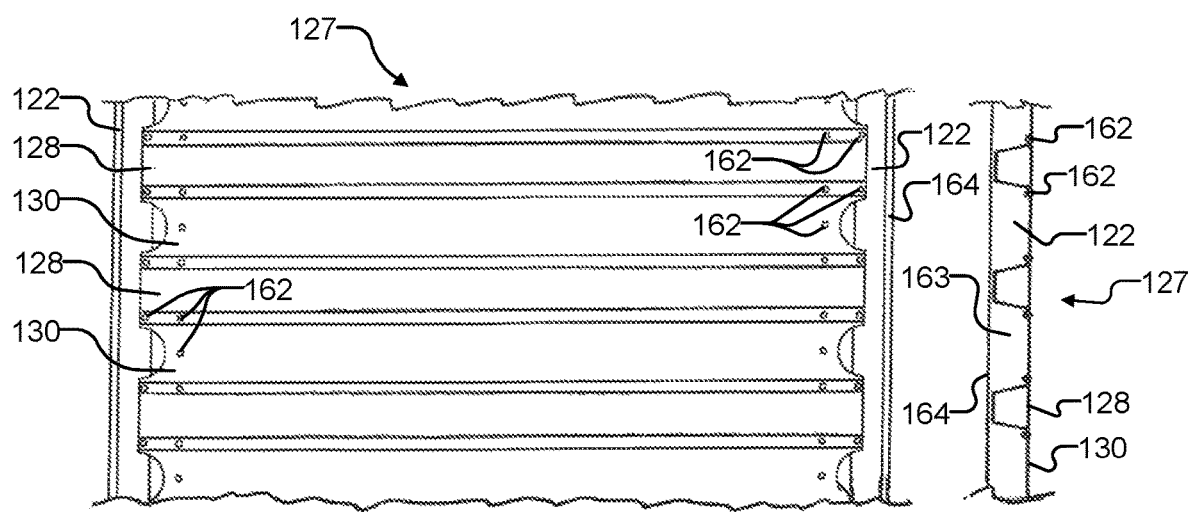
FIG. 3B
FIG. 3C

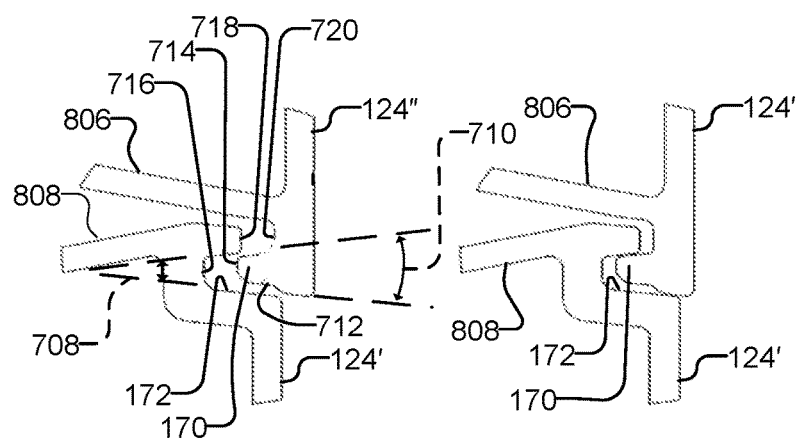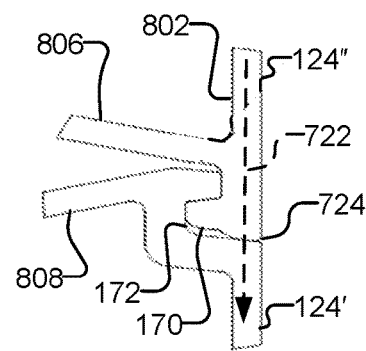
FIG. 7G  FIG. 7H  FIG. 7I
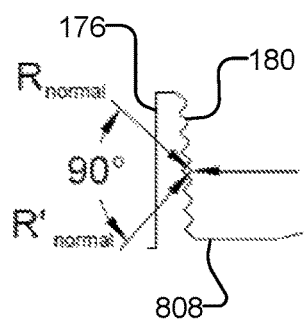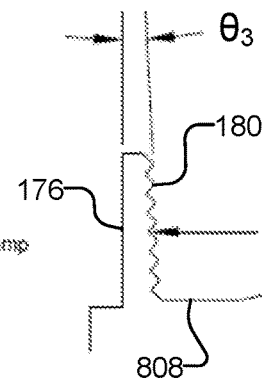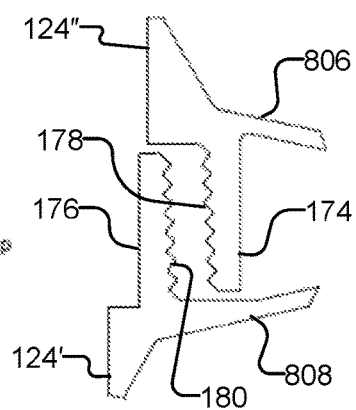
FIG. 7J  FIG. 7K  FIG. 7L

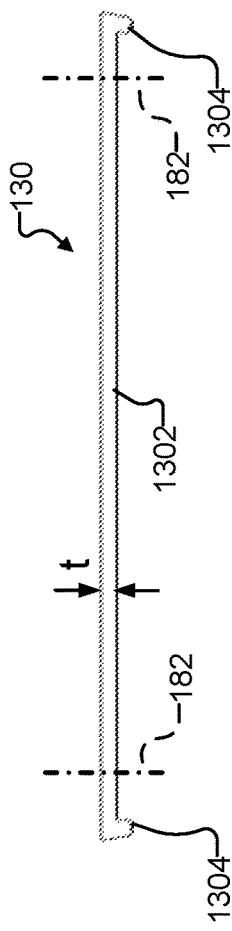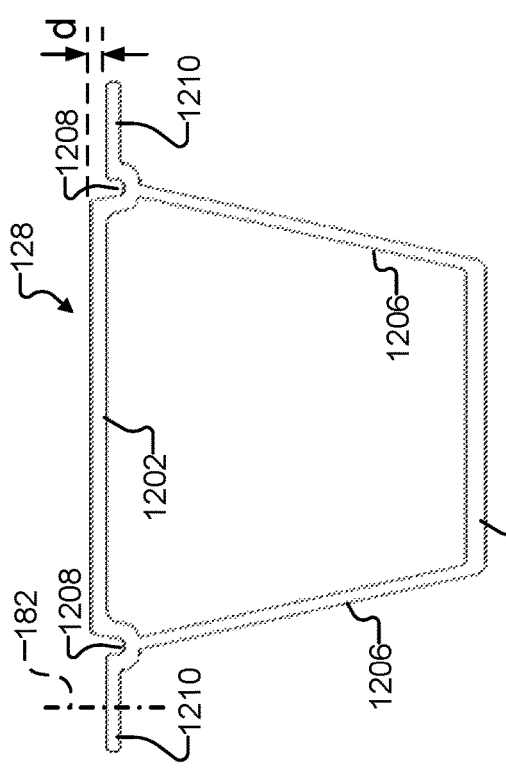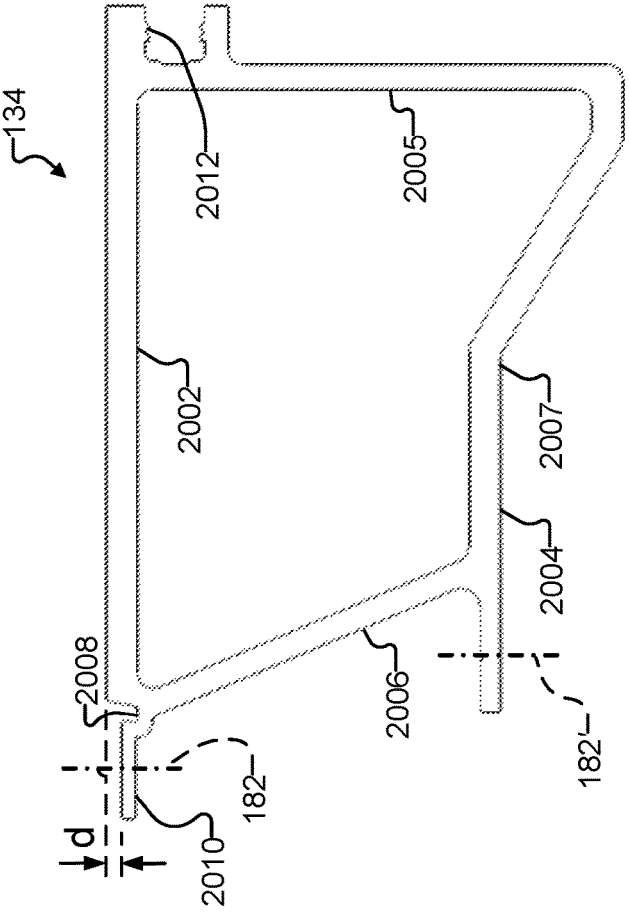

END DUMP TRAILER AND MODULAR EXTRUSIONS THEREFOR

CROSS-REFERENCE TO RELATED APPLICATIONS

This application claims the benefit of U.S. Provisional Application No. 62/468,916, filed on Mar. 8, 2017, and entitled END DUMP TRAILER AND MODULAR EXTRUSIONS THEREFOR, which is hereby incorporated by reference in its entirety.

TECHNICAL FIELD

The following disclosure relates to dumping vehicles, for example dump trucks and dump trailers, and in particular to an end dump fifth wheel trailer having a non-welded aluminum body and extrusions for fabricating same.

BACKGROUND

End dump fifth wheel trailers have an elongated, open-topped body for holding bulk materials and a hydraulic cylinder for lifting the front end of the body into a tilted configuration so that the bulk material dumps from an openable rear end gate. End dump trailers typically have supporting axles and wheels disposed near the rear end of the body and a kingpin disposed near the front end of the body for attachment to the fifth wheel of a conventional tractor (i.e., semi-truck). End dump trailers may be further classified as either frame-type trailers or frameless-type trailers depending on how the body is supported.

Frame-type end dump trailers have a main frame extending continuously between the kingpin and the supporting axles and wheels disposed near the rear of the trailer. Both the kingpin and the supporting axles are connected to the main frame rather than to the body. During transport over the road ("hauling") the body bears on the main frame, whereby the weight of the body and its cargo is supported by the main frame. The body is pivotally attached to the rear of the main frame for tilting during dumping. The hydraulic cylinder is attached to the front of the main frame and lifts the front end of the body relative to the main frame, i.e., the main frame remains generally horizontal as the body is tilted for dumping. A disadvantage of frame-type end dump trailers is relatively high empty weight. The relatively high empty weight results from the need for the main frame to have sufficient strength to support the entire weight of the body and the cargo during hauling coupled with the need for the body to have sufficient strength to support the weight of the cargo as well its own weight when raised (i.e., tilted) by the hydraulic cylinder for dumping. Because total vehicle weight (including cargo) is often regulated by law, a higher empty trailer weight results in reduced net cargo capacity. A need therefore exists, for frame-type end dump trailers having lower empty weight.

Frameless-type trailers do not have a continuous main frame, but instead have a subframe mounted directly to a rear portion of the body. The supporting axles and wheels are connected to the subframe. The kingpin is disposed on a separate kingpin plate along with the hydraulic cylinder that lifts the front of the body to dump cargo. The kingpin plate is typically connected to the body by a pair of draft arms having front ends pivotally attached to the kingpin plate and rear ends pivotally attached to the body midway between the front and rear ends. The draft arms transmit force from the kingpin to body for pulling and braking the trailer, however, the draft arms to not provide any vertical support for the body. During hauling, the front end of the body is supported by the kingpin plate and the rear end of the body is supported by the subframe with its axles and wheels. Since there is no main frame extending between the kingpin plate and the subframe, the body must be strong enough to support its own weight and the weight of the cargo during both hauling and dumping. During dumping, the hydraulic cylinder on the kingpin plate lifts the front of the body (the kingpin plate itself remaining attached to the fifth wheel of the tractor) and the rear of the body pivots on the rear wheels while the draft arms maintain a pivoting connection between the body and the kingpin plate. An advantage of frameless-type end dump trailers is relatively low empty weight. The relatively low empty weight results from elimination of the main frame by providing a body with sufficient strength to support the entire weight of the body and the cargo during both hauling and dumping. The lower empty trailer weight results in increased net cargo capacity. However, the body of a frameless-type trailer needs higher strength since it is not supported by a main frame during hauling. A need therefore exists, for frameless-type end dump trailers having both higher strength and lower empty weight.

Aluminum alloys may be used in fabricating bodies for either frame-type or frameless-type end dump trailers to provide lower empty weight and higher net cargo capacity. Aluminum alloys are alloys in which aluminum is the predominant metal. The typical alloying elements are copper, magnesium, manganese, silicon, tin and zinc. Aluminum alloy compositions are registered with The Aluminum Association, a trade association based in Arlington, Va. Many organizations publish specific standards for the manufacture of aluminum alloy, including the Society of Automotive Engineers ("SAE"), ASTM International ("ASTM"), the American National Standards Institute ("ANSI"), the Deutsches Institut für Normung e.V. ("DIN"; in English, the "German Institute for Standardization") and the International Organization for Standardization ("ISO"). The International Alloy Designation System is the most widely accepted naming scheme for wrought aluminum alloys. Each alloy is given a four-digit number, where the first digit indicates the major alloying elements, the second (if different from 0) indicates a variation of the alloy, and the third and fourth digits identify the specific alloy in the series. For example, the 6000 series of aluminum alloys comprise aluminum alloyed with magnesium and silicon. Well-known member of the 6000 series include alloys 6061, 6005 and 6005A.

Many aluminum alloys may be heat treated (i.e., "tempered") to produce substantially higher yield strengths than the base alloy. A temper designation consisting of a dash, a letter and potentially one-to-three digit number is used following the alloy series number to designate the type and degree of tempering. For example, full soft (annealed) alloy is designated "-O" and alloy heat treated to produce stable tempers is designated using the "-T" series from "-T1" through "-T10" where the trailing number indicates the specific heat treatment process used. In some cases, annealed alloy is referred to as "-T0" rather than "-O". Thus, for example: "6061-0 aluminum" (alternatively "6061-T0") designates annealed 6061 alloy having a maximum tensile strength of about 18,000 psi and a maximum yield strength of about 8,000 psi; "6061-T4 aluminum" designates 6061 alloy that has been solution heat treated and naturally aged to have a maximum tensile strength of about 30,000 psi and a maximum yield strength of about 16,000 psi; and "6061-T6 aluminum" designates 6061 alloy that has been solution heat treated and artificially aged to have a maximum tensile strength of about 45,000 psi and a maximum yield strength of about 39,000 psi. Since the weight of the aluminum alloy does not change significantly between O/T0, T4 and T6 tempers, it will be appreciated that alloys having higher tempers such as T6 have a much higher strength to weight ratio than the base alloy (annealed). Thus, the use of high temper aluminum alloys such as 6061-T6, 6005-T6 and 6005A-T6 for fabricating trailer bodies can provide much higher strength for hauling and dumping at substantially lower weight than use of the untempered (annealed) base alloys.

Although many aluminum alloys including, for example, the 6000-series alloys such as 6061, 6005 and 6005A, are highly weldable using, e.g., tungsten inert gas welding (TIG) or metal inert gas welding (MIG), the use of high temper alloys such as T4 and T6 in large welded structures may be problematic. After welding, the properties of high tempered alloys in the vicinity of the weld are typically degraded to those of –O/T0 (annealed) alloy, a loss of strength of around 80% compared to the original T6 tempered alloy. Although it is possible to re-heat-treat the material by controlled reheating to restore the high temper, this is typically impractical where the structure is a large fabrication such as a trailer body. Thus, after welding T6 tempered alloy, industry guidelines recommend the design strength of the alloy material adjacent to the weld to be taken as the strength of the annealed base alloy (–O/T0) instead of the tempered alloy. Even relatively routine workshop procedures involving the heating of tempered aluminum alloy are not advised, because the material may be damaged (e.g., reduced temper and reduced strength) with no visual sign. A need therefore exists, for aluminum bodies for end dump trailers fabricated from tempered aluminum where the loss of temper due to welding the tempered aluminum is avoided.

Due to the rough use encountered while loading, hauling and dumping bulk materials from an end dump trailer, damage to the body may occur. If the body is made from tempered aluminum alloy, repairing a damaged section with welding will result in loss of temper and the associated loss of strength in the aluminum alloy material. A need therefore exists, for aluminum bodies made of high temper aluminum alloy that can be repaired without welding

SUMMARY

A fifth wheel end dump trailer comprises a kingpin plate having a kingpin attachable to a fifth wheel connection, a hydraulic cylinder having a first end attached to the kingpin plate, and a pair of draw bars, each draw bar having a first end attached to the kingpin plate and a body. The body has an open top and a front end attached to a second end of the hydraulic cylinder. The second ends of the draw bars are attached to a middle portion of the body. The body includes a subframe at a back end for mounting axles, wheels and tires. The body comprises a plurality of modular assemblies that are connected by drilling and using mechanical fasteners without welding. Extending the hydraulic cylinder between the first and second ends raises the front end of the body causing the body to tilt.

In one embodiment, the modular assemblies are extrusions.

In another embodiment, the extrusions are tempered aluminum alloy extrusions having a temper of T5 or higher.

Although the description herein generally refers to a frameless-type dump trailer and dump body therefor, the various aspects and embodiments described herein can also be used for a frame-type dump trailer and a dump body therefore, for a quarter-frame-type dump trailer and a dump body therefor, and for a dump truck and a dump body therefor.

In another aspect, a dump trailer body comprises a modular sidewall including at least a first side spacer extrusion and a bottom rail extrusion. The first side spacer extrusion is a first aluminum alloy extrusion tempered by heat treating and having a first constant cross section along a first extrusion axis, the first constant cross section defining a first outer sidewall, a first inner sidewall, a first bottom wall and a first upper wall joined together to define a first box-like structure. A first slot portion and a first outer tab portion are disposed at opposite ends of the first upper wall, and a first hook portion and a first inner tab portion are disposed at opposite ends of the first bottom wall. The bottom rail extrusion is a second aluminum alloy extrusion tempered by heat treating and having a second constant cross section along a second extrusion axis, the second constant cross section defining a second outer sidewall, a second inner sidewall, a second bottom wall and a second upper wall jointed together to define second box-like structure. A second slot portion and a second outer tab portion are disposed at opposite ends of the second upper wall. The first side spacer extrusion is disposed relative to the bottom rail extrusion such that the first hook portion mechanically engages the second slot portion and the first inner tab portion is disposed against the second outer tab portion. At least one first fastener extends through aligned holes passing through the first inner tab portion and the second outer tab portion and mechanically engages the first inner tab portion to the second outer tab portion.

In one embodiment, the modular sidewall further comprises a second side spacer extrusion, wherein the second side spacer extrusion is disposed relative to the first side spacer extrusion such that the first hook portion of the second side spacer extrusion mechanically engages the first slot portion of the first side spacer extrusion and the first inner tab portion of the second side spacer extrusion is disposed against the first outer tab portion of the first side spacer extrusion. At least another first fastener extends through aligned holes passing through the first inner tab portion and the first outer tab portion and mechanically engages the first inner tab potion to the first outer tab portion.

In another embodiment, the modular sidewall further comprises a top rail extrusion being another aluminum alloy extrusion tempered by heat treating and having a top rail constant cross section along a top rail extrusion axis, the top rail constant cross section defining a top rail outer sidewall, a top rail inner sidewall, a top rail bottom wall and a top rail upper wall joined together to form a box-like structure. A top rail hook portion and a top rail inner tab portion are disposed at opposite ends of the top rail bottom wall. The top rail extrusion is disposed relative to an uppermost side spacer extrusion such that the top rail hook portion mechanically engages the first slot portion of the uppermost side spacer extrusion and the top rail inner tab portion is disposed against the first outer tab portion of the uppermost side spacer extrusion. At least one top rail fastener extends through aligned holes passing through the top rail inner tab portion and the first outer tab portion of the uppermost side spacer extrusion and mechanically engages the top rail inner tab portion to the first outer tab portion.

In still another embodiment, the first bottom wall is configured to define a first angle, relative to a first perpendicular line from the first outer sidewall, between the first hook portion and the first inner tab portion, and the second upper wall is configured to define a second angle, relative to a second perpendicular line from the second outer sidewall, between the second slot portion and the second outer tab portion. The connection of the first inner tab portion and the second outer tab portion forms a triangular joint structure comprising a first wall, a second wall and a third wall, wherein the first wall of the triangular joint is formed by the engaged first inner tab portion and the second outer tab portion, the second wall of the triangular joint runs between a first end of the first wall and the engaged first hook portion and second slot portion, and the third wall of the triangular joint runs between a second end of the first wall and the engaged first hook portion and the second slot portion.

In yet another embodiment, the first angle of the first bottom wall is in the range from −15 degrees to −8 degrees relative to the first perpendicular line from the first outer sidewall, and the second angle of the second upper wall is in the range from 15 degrees to 8 degrees, relative to the second perpendicular line from the second outer sidewall.

In a further embodiment, a portion of the at least one first fastener extends through the aligned holes in the first inner tab portion and the second outer tab portion extends into an interior portion of the triangular joint structure bounded by the first wall, the second wall and the third wall.

In a still further embodiment, the first inner tab portion of the side spacer extrusion is thicker at a supporting end attached to the bottom wall and tapers to be thinner at a free end and the first outer tab portion of the side spacer extrusion is thicker at a supporting end attached to the top wall and tapers to be thinner at a free end. Engagement features are defined on an outer-facing surface of the first inner tab portion and on an inner-facing surface of the first outer tab portion. The engagement features are serrations having successive faces angled 90 degrees relative to one another and angled +/−45 degrees relative to a fastener clamping direction.

In a yet further embodiment, the first slot portion of the side spacer extrusion includes a first taper and the first hook portion of the side spacer extrusion includes a second taper. The first and second tapers are configured to provide an increasingly tight fit as the first hook portion moves further into a first slot portion of another side spacer extrusion having an identical profile.

In another aspect, a dump trailer body further comprises a modular floor including at least one floor crossmember extrusion and at least one floor plate extrusion. The floor crossmember extrusion is a third aluminum alloy extrusion tempered by heat treating and having a third constant cross section along a third extrusion axis, the third constant cross section defining an upper plate, a bottom plate and two side plates joined together to define a third box-like structure. A third slot portion is formed at the junction of each side plate with the top plate, and a third tab portion extends outwardly from each third slot portion. The floor plate extrusion is a fourth aluminum alloy extrusion tempered by heat treating and having a fourth constant cross section along a fourth extrusion axis, the fourth constant cross section defining a central plate and a pair of fourth hook portions disposed on lateral ends of the central plate. The floor plate extrusion is disposed relative to the floor crossmember extrusion such that at least one of the fourth hook portions mechanically engages at least one of the third slot portions and at least a portion of the central plate overlies at least one of the third tab portions. At least one third fastener extends through aligned holes passing through the overlying portion of the central plate and the third tab portion and mechanically engages the floor plate extrusion to the floor crossmember extrusion. The bottom rail extrusion further comprises a sidewall tab portion extending from the bottom wall. The modular floor is disposed relative to the bottom rail extrusion such that the sidewall tab portion overlies at least a portion of the modular floor. At least one fourth fastener extends through aligned holes passing through the overlying sidewall tab portion and the modular floor and mechanically engages the modular floor to the modular sidewall.

In a further embodiment, the bottom rail extrusion further comprises a fillet portion extending down and inward at an obtuse angle from an upper portion of the inner sidewall to a distal end. A fillet tab portion is connected to the distal end of the fillet portion, and extends in line with the sidewall tab portion. The modular floor is disposed relative to the modular bottom rail extrusion such that the fillet portion and the fillet tab portion overlie at least a portion of the modular floor. At least one fifth fastener extends through aligned holes passing through the overlying fillet tab portion and the modular floor and mechanically engages the fillet tab portion to the modular floor. The fillet portion defines an obtuse angle between the modular sidewall and the modular floor on the interior surface of the dump trailer body when viewed along a centerline of the trailer body.

In a still further embodiment, the floor plate extrusion has a thickness of d and the third tab portions of the floor crossmember extrusion extend substantially parallel to the upper plate, but are displaced downward by a distance d, whereby the modular floor has a flush upper surface.

In a yet further embodiment, the third box-like structure of the floor crossmember extrusion has a trapezoidal cross-section viewed along the third extrusion axis.

In another embodiment, the modular floor further comprises a plurality of spaced-apart floor crossmember extrusions arranged perpendicular to a centerline of the trailer body, a plurality of floor plate extrusions arranged parallel to the floor crossmember extrusions, and a rear sill extrusion disposed at a rear end of the trail body floor and arranged parallel to the floor crossmember extrusions. The rear sill extrusion is a fifth aluminum alloy extrusion tempered by heat treating and having a fifth constant cross section along a fifth extrusion axis, the fifth constant cross section defining a sill upper plate, a sill bottom plate, a sill rear wall and a sill front wall joined together to define a fifth box-like structure. A fifth slot portion is formed at the junction of the sill top plate and the sill front wall and a fifth tab portion extends outwardly from the fifth slot portion. One floor plate extrusions is disposed between each adjacent pair of the floor crossmember extrusions, and the fourth hook portions of the floor plate extrusions mechanically engage the respective slot portions the adjacent of the pair of floor crossmember extrusions. A rearmost floor plate extrusion is disposed between the rear sill extrusion and a rearmost floor crossmember extrusion, and the fourth hook portions of the rearmost floor plate extrusion mechanically engages the respective slot portions of the rear sill extrusion and the rearmost floor crossmember extrusion.

In still another embodiment, a portion of the floor crossmember extrusions in the modular floor are floor crossmember subframe variant extrusions further comprising flanges extending outwardly from each end of the bottom plate.

In yet another embodiment, a dump trailer body further comprises a modular subframe including a plurality of subframe extrusions and a plurality of floor crossmember extrusions. The floor crossmember extrusion is a sixth aluminum alloy extrusion tempered by heat treating and having a sixth constant cross section along a sixth extrusion axis, the sixth constant cross section defining an upper plate and a pair of downlegs joined to the upper plate to form an inverted-V structure. The plurality of floor crossmember extrusions are arranged parallel to the centerline of the trailer body and disposed beneath a portion of the modular floor to form a first subframe layer. The plurality of floor crossmember extrusions are arranged perpendicular to the centerline of the trailer body and disposed beneath a portion of the first subframe layer to form a second subframe layer. The first and second subframe layers are connected to the modular floor and to one another using mechanical fasteners.

In a further embodiment, the modular sidewall is connected to respective first lateral ends of the at least one floor crossmember extrusion and at least one floor plate extrusion, and the trailer body further comprises a second modular sidewall connected to respective second lateral ends of the at least one floor crossmember extrusion and at least one floor plate extrusion. The connection of the second modular sidewall to the respective second lateral ends of the at least one floor crossmember extrusion and at least one floor plate extrusion are formed with mechanical fasteners.

In a still further embodiment, a modular headboard is connected to the modular sidewall, the modular floor and the second modular sidewall. The connections of the modular headboard to the modular sidewall, the modular floor and the second modular sidewall are formed with mechanical fasteners.

In another aspect, a method is provided for connecting two modular components made of aluminum alloy tempered by heat treatment. The method comprises configuring a first extruded member to have a longitudinal hook portion and a longitudinal inner tab portion with first engagement features facing away from the hook portion. A second extruded member is configured to have a longitudinal groove portion and a longitudinal outer tab portion with second engagement features facing toward the groove portion. The first and second extruded members are positioned so that the hook portion is aligned with the groove portion and the first and second engagement features are aligned with one another. The first and second extruded members are moved in a single direction relative to one another to engage the hook portion with the groove portion and to engage the first engagement features with the second engagement features. While holding the first engagement features engaged with the second engagement features, a plurality of holes are drilled through the inner and outer tabs. While holding the first engagement features engaged with the second engagement features, a fastener is inserted into each of the plurality of holes through the inner and outer tabs. While holding the first engagement features engaged with the second engagement features, each of the fasteners is activated to connect the inner and outer tabs together and to make permanent the engagement of the first and second engagement features.

In one embodiment, configuring the first extruded member further includes configuring the first extruded member to have a first angled wall extending from the hook portion to a proximal end of the inner tab portion, and configuring the second extruded member further includes configuring the second extruded member to have a second angled wall extending from the groove portion to a proximal end of the outer tab portion. The inner and outer tabs are connected together to form a triangular structure having a first side comprising the first angled wall, a second side comprising the second angled wall, and a third side comprising the connected inner and outer tabs.

In another aspect, a method is provided for repairing a damaged modular component connected to an undamaged modular component, where both modular components are made of aluminum alloy tempered by heat treatment, where the damaged and undamaged modular components were assembled in a forward direction relative to one another to engage a hook portion with a slot portion and to engage an outer tab with an inner tab, and one or more fasteners connected the outer tab with the inner tab. The method comprises removing each of the fasteners connecting the inner and/or outer tab of the damaged modular component to the undamaged modular component. The damaged and undamaged modular components are moved in a reverse direction relative to one another to disengage the hook portion from the slot portion and to disengage the inner tab from the outer tab. The damaged modular component is replaced with a replacement modular component. replacing the damaged modular component with a replacement modular component. The undamaged modular component and the replacement modular component are reassembled in the forward direction relative to one another to engage the hook portion with the groove portion and to engage the outer tab with the inner tab. While holding the outer tab engaged with the inner tab, holes are drilled through the inner and/or outer tabs of the replacement modular component and/or of the undamaged modular component, fasteners are inserted into the holes, and the inserted fasteners are activated to connect the inner and/or outer tab of the replacement modular component to the undamaged modular component.

BRIEF DESCRIPTION OF THE DRAWINGS

For a more complete understanding, reference is now made to the following description taken in conjunction with the accompanying Drawings in which:

FIG. 3A is a cross-sectional view of the body showing the modular body side walls and modular body floor;

FIG. 3B is a partial bottom view of a portion of the modular body floor of FIG. 3A; and FIG. 3C is a partial cross-sectional view of the portion of the modular floor of FIG. 3B;

FIGS. 7A through 7E are cross-sectional views of a side spacer and a top rail forming part of the modular side wall illustrating the exemplary assembly and connection of the components without welding, wherein:

FIG. 7A shows the side spacer and top rail separated prior to assembly;

FIG. 7B shows the side spacer and top rail moved vertically to align the tabs, hook and slot with one another prior to engagement thereof;

FIG. 7C shows the side spacer and top rail moved laterally to engage the tabs with one another and to engage the hook with the slot;

FIG. 7D shows a hole formed through the engaged tabs into the fastener receiving cavity; and FIG. 7E shows the fastener inserted through the hole in the tabs and installed to permanently join the tabs;

FIGS. 7G through 7I are enlarged partial views of the hook portion and slot portion illustrating further details of these connecting structures;

FIGS. 7J through 7L are enlarged partial views of the inner tab portion and outer tab portion illustrating further details of these connecting structures;

FIGS. 8 through 25 are cross-sectional extrusion drawings (i.e., viewed along the extrusion axis) showing details of the modular components assembled without welding to form the trailer body in accordance with further embodiments, the various drawings also comprising enlarged views illustrating details of the subject modular component and illustrating how the subject modular component interfits with adjacent modular components for modular assembly of the dump trailer and/or trailer body for connection without welding, wherein:

FIG. 8 is a cross-sectional extrusion drawing of a side spacer extrusion for the modular side wall and the modular headboard wall;

FIG. 9 is a cross-sectional extrusion drawing of a top rail extrusion for the modular side wall;

FIG. 10 is a cross-sectional extrusion drawing of a bottom headboard rail extrusion for the modular headboard wall;

FIG. 11 is a cross-sectional extrusion drawing of a bottom rail extrusion for connecting the modular side wall to the modular body floor;

FIG. 12 is a cross-sectional extrusion drawing of a floor crossmember extrusion for the modular body floor;

FIG. 13 is a cross-sectional extrusion drawing of a floor plate extrusion for the modular body floor;

FIG. 14 is a cross-sectional extrusion drawing of a modular floor crossmember-subframe variant extrusion for the modular subframe;

FIG. 15 is a cross-sectional extrusion drawing of a front corner post extrusion for connecting the modular side wall to the modular headboard wall;

FIG. 16 is a cross-sectional extrusion drawing of the top headboard rail extrusion for the modular headboard wall;

FIG. 17 is a cross-sectional extrusion drawing of the rear cap extrusion for the modular sidewall;

FIG. 18 is a cross-sectional extrusion drawing of the draft arm bearing block extrusion for the modular draft arm assembly;

FIG. 19 is a cross-sectional extrusion drawing of the draft arm bracket extrusion for the modular draft arm assembly;

FIG. 20 is a cross-sectional extrusion drawing of the rear apron (sill) extrusion for the modular body floor;

FIG. 21 is a cross-sectional extrusion drawing of the subframe longitudinal member extrusion for the modular subframe and also for the subframe crossmember;

FIG. 22 is a cross-sectional extrusion drawing of the tailgate frame extrusion for the modular tailgate;

FIG. 23 is a cross-sectional extrusion drawing of the landing gear mount flange extrusion for the modular draft arm assembly;

FIG. 24 is a cross-sectional extrusion drawing of the draft arm tube extrusion for the modular draft arm assembly;

FIG. 25 is a cross-sectional extrusion drawing of the tailgate pin housing extrusion for the modular tailgate;

DETAILED DESCRIPTION

Figure 1:
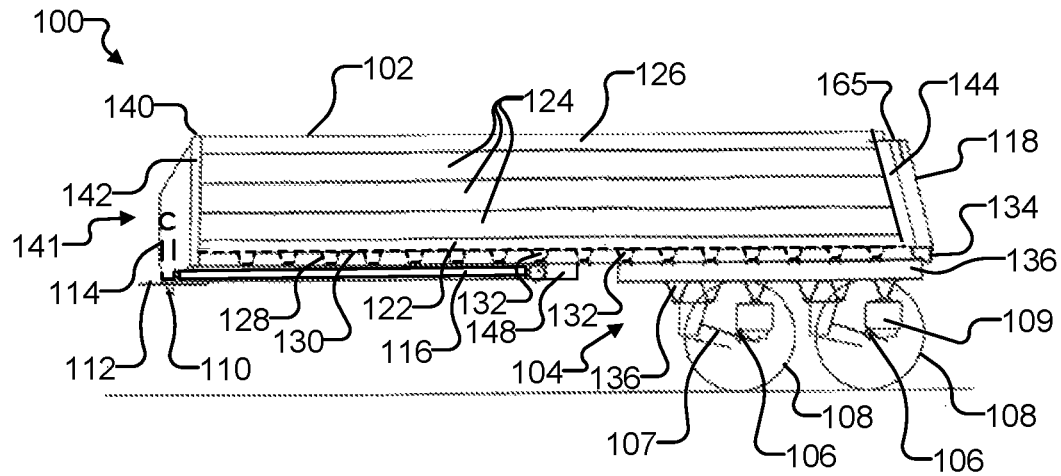
FIG. 1 is a cross-sectional side view of a frameless-type fifth wheel end dump trailer in accordance with one aspect, the trailer being configured for hauling.

Forming a trailer body from tempered aluminum alloy provides relatively high strength and relatively low weight. However, when tempered aluminum is welded, up to 80% of its strength is lost. This greatly reduces the advantage of using tempered aluminum alloy if a trailer body is fabricated with welding. In addition, welding requires relatively high skill and workmanship to control undesirable porosity, undercutting, etc. This leads to relatively higher labor costs for fabricating welded structures.

Drilling and fastening tempered aluminum alloy with mechanical fasteners including, but not limited to, bolts, rivets, Huck® HuckBolt® brand swaged fasteners, Huck® BobTail® brand swaged fasteners, Huck® Magna-Lok® brand blind fasteners, Avdel® brand fasteners, and the like, does not anneal the aluminum alloy. Therefore the temper of the alloy is maintained and the associated higher strength allows the trailer body to meet the necessary strength requirements at reduced weight. In addition, only ordinary skill and workmanship are required for drilling and installing mechanical fasteners to provide reliable, consistent results. This results in relatively lower labor cost compared to welding. Further, mechanically fastened joints allow flexibility whereas welded joints are rigid and often crack. For purposes of this application, the terms "fastener" and "mechanical fastener" include all mechanisms for holding two workpieces together by friction, interference fit, mechanical stress or mechanical deformation of the fastener and without using significant heating of the workpieces (where significant heating is any heating that permanently changes a workpiece's properties after the workpiece returns to its original temperature).

In the current disclosure, a fifth wheel end dump trailer is described that is fabricated without welding through the use of modular tempered aluminum alloy assemblies that are connected by drilling and using mechanical fasteners. In addition, designs for the tempered aluminum alloy extrusions comprising the modular assemblies are provided.

Referring now to the drawings, wherein like reference numbers are used herein to designate like elements throughout, the various views and embodiments of an end dump trailer and modular extrusions therefor are illustrated and described, and other possible embodiments are described.

The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, there is illustrated a frameless-type fifth wheel end dump trailer 100 in accordance with one aspect. For clarity, the hauling tractor is not shown, however the trailer 100 is depicted as if connected to the fifth wheel of a tractor. The trailer 100 includes an open-topped body 102 for holding and carrying bulk material (i.e., cargo). A subframe 104 is mounted directly to a rear portion of the body 102. Mounted to the subframe 104 are supporting axles 106 and wheels 108. In the illustrated embodiment, the axles 106 are flexibly connected to the subframe 104 with links 107 and air springs 109, however, alternative suspension components (e.g., coil springs or leaf springs) may be used in other embodiments. A kingpin 110 is provided on a separate kingpin plate 112 along with a hydraulic cylinder 114 that lifts the front of the body 102 to dump cargo. The kingpin plate 112 is connected to the body 102 by a pair of draft arms 116 having front ends pivotally attached to the kingpin plate and rear ends pivotally attached to the body midway between the front and rear ends. The draft arms 116 transmit force from the kingpin 110 to body 102 for pulling and braking the trailer 100, however, the draft arms to not provide any vertical support for the body. During hauling, the front end of the body 102 is supported by a body stop (not shown) on the body that interfits with a support member on the kingpin plate 112 and the rear end of the body is supported by the subframe 104 with its axles 106 and wheels 108. A hinged tailgate 118 is provided at the rear end of the body 102 for dumping the cargo. The tailgate 118 may be locked closed during hauling and unlocked during dumping.

Figure 2:
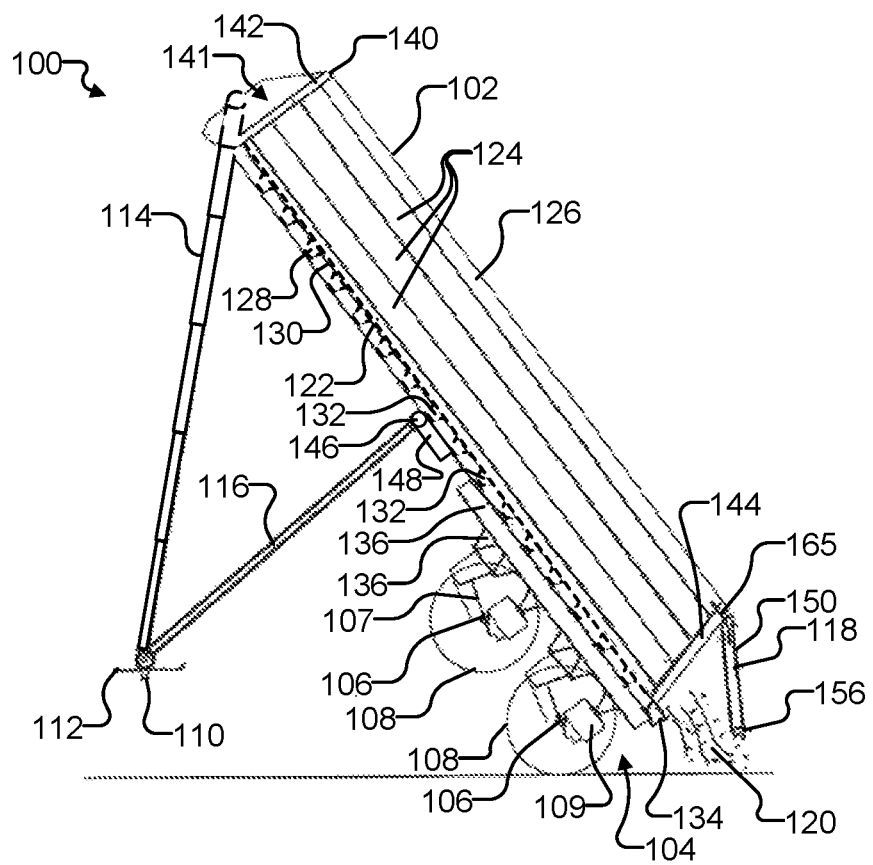
FIG. 2 shows the end dump trailer of FIG. 1, wherein the trailer is tilted for dumping.

Referring now to FIG. 2, for dumping the cargo the hydraulic cylinder 114 on the kingpin plate 112 is extended to lift the front end of the body 102, the kingpin plate itself remaining attached to the fifth wheel of the tractor (not shown). During dumping, the rear of the body 102 pivots on the rear wheels 108 while the draft arms 116 maintain a pivoting connection between the body and the kingpin plate 112. As the body 102 is tilted, the hinged tailgate 118 is unlocked so that it can swing open and release the cargo 120. The draft arms 116 are connected to the body using draft arm bearing block extrusions 146 (see FIG. 18).

Referring still to FIGS. 1 and 2, the body 102 may be fabricated without welding using modular tempered aluminum alloy components that are connected by drilling and using bolts, rivets or other mechanical fasteners. The modular tempered aluminum alloy components may be extrusions of aluminum alloy, wherein each component has a constant cross section (i.e., when viewed longitudinally along the axis of extrusion). As further described herein, the aluminum alloy extrusions comprising the modular components may include first portions especially configured to interfit and cooperate with second portions of identical or different modular components to minimize the number of holes that must be drilled and/or the number of bolts, rivets or other mechanical fasteners needed to provide a permanent structural joint between the modular components. The interfitting portions may be configured to increase the tensile strength of the joint and/or to increase the frictional area between the joining surfaces so as to resist relative movement after joining.

In the embodiment of FIGS. 1 and 2, the modular components forming the side walls 121 (FIG. 3A) of the body 102 include a bottom rail extrusion 122, side spacer extrusions 124 and a top rail extrusion 126. In the embodiment of FIGS. 1 and 2, the modular tempered aluminum alloy components forming the floor 127 (FIG. 3A) of the body 102 include floor crossmember extrusions 128, floor plate extrusions 130, floor crossmembers subframe variant extrusions 132 and a rear apron (or sill) extrusion 134. In the embodiment of FIGS. 1 and 2, the modular tempered aluminum alloy components forming the subframe 104 of the body 102 include subframe extrusions 136 that may oriented both longitudinally and laterally (i.e., with respect to the center axis of the body). In the embodiment of FIGS. 1 and 2, the modular tempered aluminum alloy components forming the headboard 141 (i.e., front wall) of the body 102 include a bottom headboard rail extrusion 138, side spacer extrusions 124 (of reduced length compared to the side spacers of the side walls) and a top headboard rail extrusion 140. In the embodiment of FIGS. 1 and 2, the modular tempered aluminum alloy components may further include front corner post extrusions 142 that connect the side walls 121 to the headboard 141 (i.e., front wall) of the body 102 and rear cap extrusions 144 that cover the rear of the side wall. In the embodiment of FIGS. 1 and 2, the modular tempered aluminum alloy components forming the tailgate 118 of the body 102 include tailgate frame extrusion 150, side spacer extrusions 124 (of reduced length compared to the side spacers of the side walls) and tailgate pin housing extrusions 156. In the embodiment of FIGS. 1 and 2, the modular tempered aluminum alloy components forming the body 102 may further include draft arm bearing block extrusions 146 and draft arm bracket extrusions 148, landing gear mount flange extrusions 152 for attachment of the "stiff legs" (not shown) and floor crossmember subframe variant extrustions 132.

Some or all of the modular components comprising the trailer body 102 may be formed from tempered aluminum alloy. In the case of modular components that are extrusions, the length of the components may be varied in different applications. For example the side spacer extrusions 124 may have different lengths for each row in the side walls 121 of the body 102, and may have still different lengths when used in the headwall or the tailgate 118. It will be understood that the tempered aluminum components may be tempered after extrusion, but before assembly into the trailer body 102.

The modular components forming the body 102 may be formed from a 6000 series aluminum alloy. In some embodiments, the modular components forming the body 102 are formed of one of 6061, 6005 or 6005A aluminum alloy. In other embodiments modular components forming the body 102 are aluminum alloy extrusions that are tempered by heat treatment. In still other embodiments, the modular components forming the body 102 are aluminum alloy extrusions having has a temper of T4 or higher, which temper is maintained after connection of the modular components into the completed body. In further embodiments, the modular components forming the body 102 are aluminum alloy extrusions having has a temper of T5 or higher, which temper is maintained after connection of the modular components into the completed body. In still further embodiments, the modular components forming the body 102 are aluminum alloy extrusions having has a temper of T6 or higher, which temper is maintained after connection of the modular components into the completed body. In some embodiments, the modular components forming the body 102 are formed from one of 6061-T4, 6005-T4 or 6005A-T4 aluminum alloy extrusions. In other embodiments, the modular components forming the body 102 are formed from one of 6061-T5, 6005-T5 or 6005A-T5 aluminum alloy extrusions. In still other embodiments, the modular components forming the body 102 are formed from one of 6061-T6, 6005-T6 or 6005A-T6 aluminum alloy extrusions.

Referring now to FIGS. 3A, 3B and 3C, there are illustrated additional details of the side wall 121 and floor 127 of the body 102. FIG. 3A is a cross-sectional view of the body showing details of the modular body side walls 121 and modular body floor 127. In the illustrated embodiment, each side wall 121 includes a bottom rail extrusion 122 permanently connected to an overlying first side spacer extrusion 124', which in turn is permanently connected to an overlying second side spacer extrusion 124", which in turn is permanently connected to an overlying third side spacer extrusion 124''', which in turn is permanently connected to a top rail extrusion 126. Each of the aforesaid connections between the components 122, 124 and 126 may be made between interfitting portions of the respective components 122, 124 and 126 to one another and made permanent by installing bolts, rivets or other mechanical fasteners 160 (in this embodiment, Huck® Magna-Loc® brand blind rivets) in holes drilled through mating tabs extending from the extruded components (see FIGS. 7A-7E). The bottom rail extrusions 122 are further connected to the floor crossmember extrusions 128, floor plate extrusions 130 and floor crossmember subframe variant extrusions 132 (FIG. 1) to connect the side walls 121 to the floor 127 of the body 102. Each of the aforesaid connections between the components 122, 128, 130 and 132 may be made between interfitting portions of the respective components 122, 128, 130 and 132 to one another and made permanent by installing bolts, rivets or other mechanical fasteners 162 (in this embodiment, Huck® HuckBolt® brand swaged bolts) in holes drilled through overlying portions of the components. A skirt portion 163 and lip portion 164 of the bottom rail extrusion 122 extend downward to further stiffen the extrusion and shield the sides of the adjacent crossmember extrusions 128.

Referring now to FIGS. 3B and 3C, there is illustrated a partial bottom view and a partial side view of a portion of the modular body floor 127 of FIG. 3A. It will be seen that the floor crossmember extrusions 128 partially overlap and interfit with the floor plate extrusions 130 along the long edges. In addition, the ends of the floor crossmember extrusions 128 and floor plate extrusions 130 overlap and interfit with the bottom rail extrusions 122. All of the components 128, 130 and 122 are permanently connected by installing bolts, rivets or other mechanical fasteners 162 in holes drilled through the overlying portions of the respective components.

Figure 4:
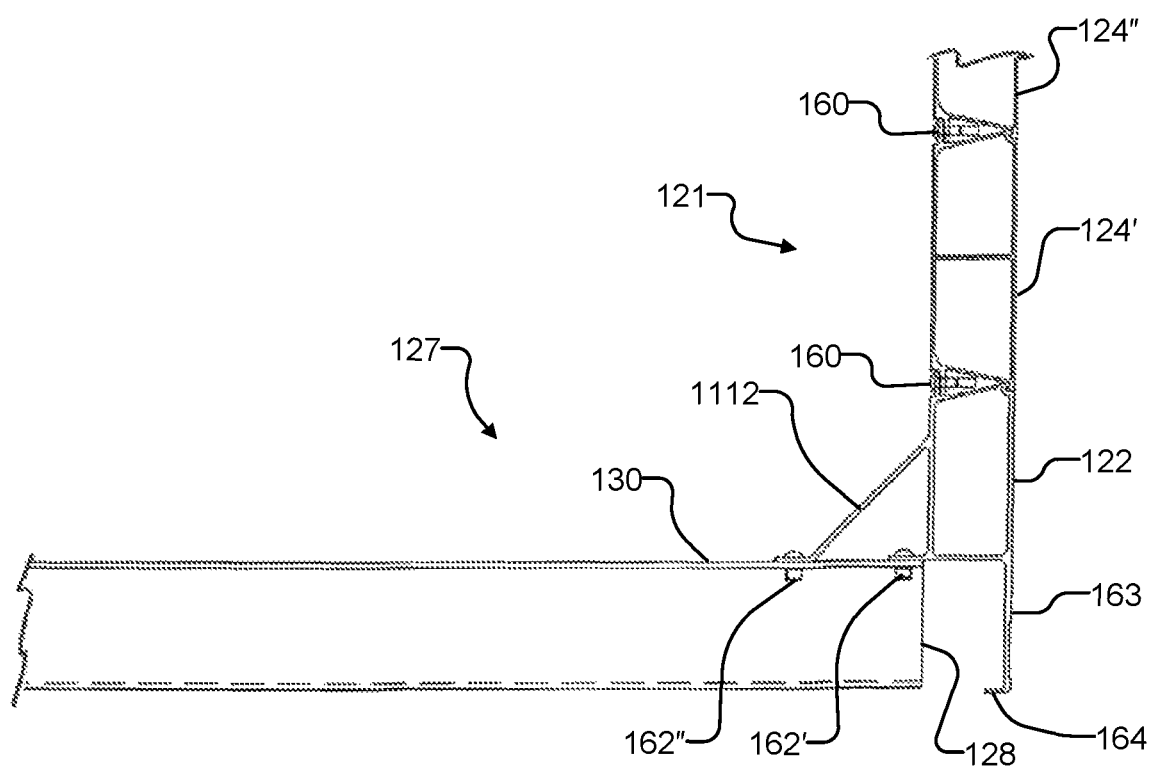
FIG. 4 is an enlarged portion from FIG. 3A illustrating details of the connection between the modular body side wall and the modular body floor.

Referring now to FIG. 4, there is illustrated an enlarged cross-sectional end view of a portion of the junction between the modular side wall 121 and the modular floor 127 shown in FIG. 3A showing additional details of the connection. The side wall 121 comprises a bottom rail extrusion 122 to which multiple sidewall spacer extrusions 124', 124" are connected using bolts, rivets or other mechanical fasteners 160. The bottom rail extrusion 122 can include a fillet member 402 extending between the side wall 121 and the floor 127, which modifies the internal profile of the body 102 to avoid a 90 degree angle at the junction of the body sidewalls and the body floor. The bottom rail extrusion 122 is connected to the modular floor 127 floor comprising floor crossmember extrusions 128 and floor plates 130 using bolts, rivets or other mechanical fasteners 162. In the illustrated embodiment, mechanical fasteners 162' forming a first row (see FIG. 5) connect the sidewall tab portion 1110 (FIG. 11) of the bottom rail extrusion 122 to the modular floor components 128, 130, and mechanical fasteners 162" forming a second row connect the fillet tab portion 1114 (FIG. 11) of the bottom rail extrusion to the modular floor components.

Figure 5:
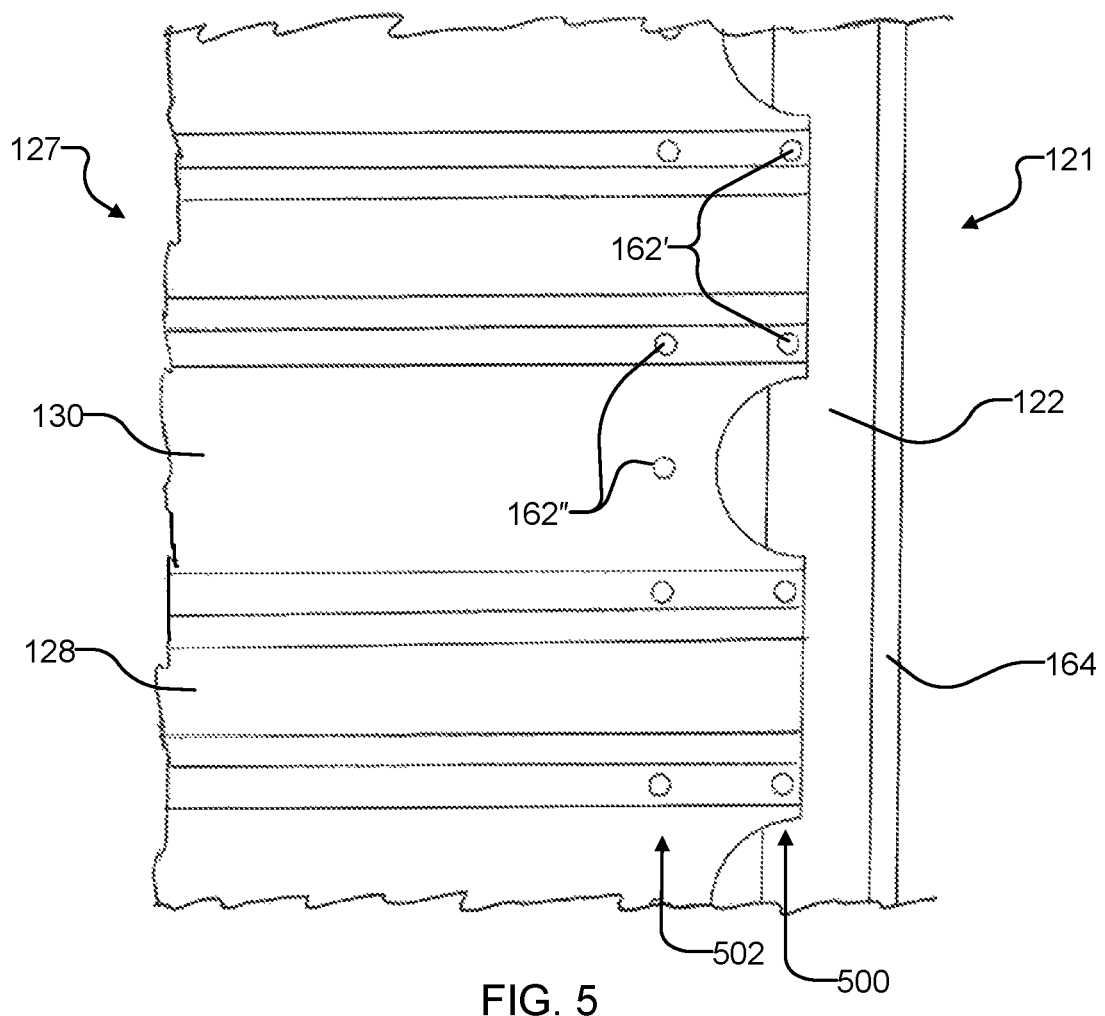
FIG. 5 is an enlarged portion from FIG. 3B illustrating details of the connection between the modular body floor and the bottom rail of the side wall.

Referring now to FIG. 5, there is illustrated an enlarged bottom view of a portion of the connection between the modular body floor 127 and the bottom rail extrusion 122 of the side wall 121 shown in FIG. 3B. In particular, the mechanical fasteners 162' forming a first row 500 connect the sidewall tab portion 1110 of the bottom rail extrusion 122 to the floor crossmember extrusions 128 and floor plate extrusions 130, and mechanical fasteners 162" forming a second row 502 connect the fillet tab portion 1114 of the bottom rail extrusion to the modular floor components. Each of the mechanical fasteners 162 (including both fasteners 162' and fasteners 162") may pass thorough the respective portion of bottom rail extrusion 122 as well as through overlapping portions of the interlocked floor crossmember extrusions 128 and floor plate extrusions 130, thereby locking the floor components 128, 130 together while also attaching the modular side wall 121 to the modular floor 127.

Figure 6:
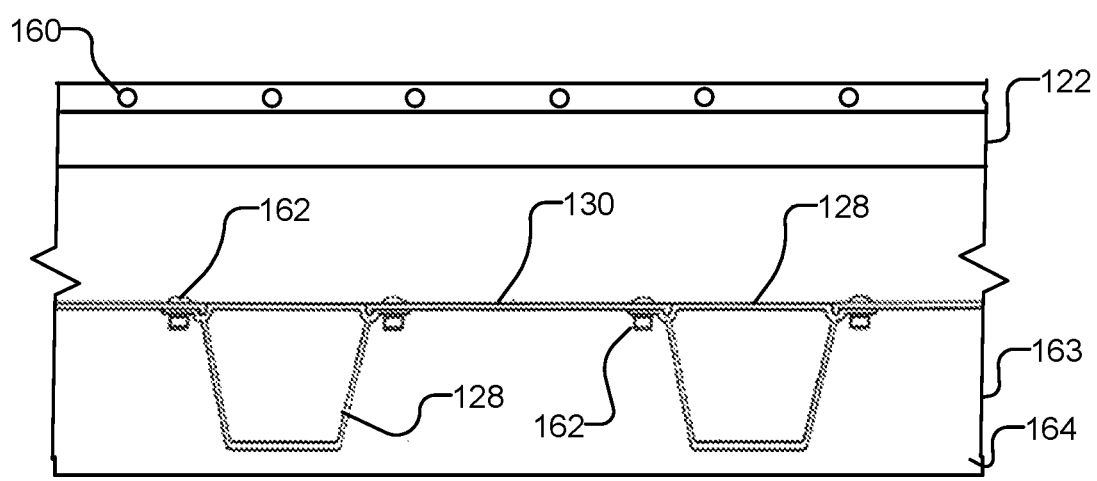
FIG. 6 is an enlarged portion from FIG. 3C illustrating details of the connection between the floor cross members and the floor plates.

Referring now to FIG. 6, there is illustrated an enlarged cross-sectional side view of a portion of the junction between the modular side wall 121 and the modular floor 127 shown in FIG. 3C. The overlapping portions of adjacent floor crossmember extrusions 128 and floor plate extrusions 130 include interlocked hook portions and slot portions as further described herein to provide increased tensile strength. The bolts, rivets or other mechanical fasteners 162 pass thorough the overlapping portions of the floor components 128 and 130 to permanently lock them together. As previously described, the same mechanical fasteners 162 can also lock the floor components 128 and 130 to the bottom rail extrusion 122 of the side wall 121.

Figures 7A, 7B, 7C:
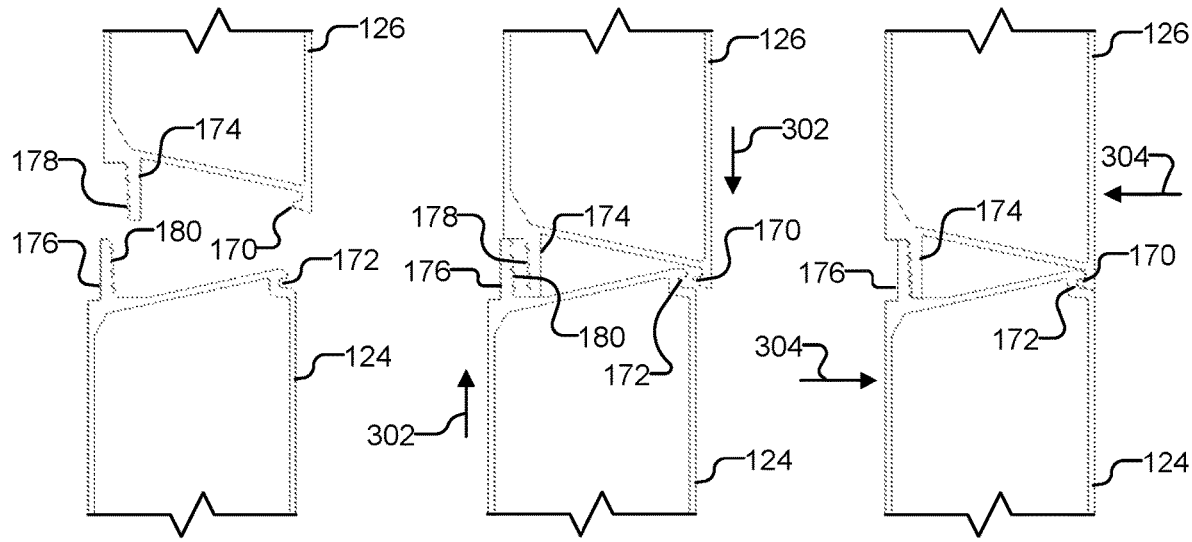

Referring now to FIGS. 7A-7E, there is illustrated an example of the non-welded permanent connection of two modular components, in this case a side spacer extrusion 124 and a top rail extrusion 126. In FIG. 7A, the side spacer extrusion 124 is separated from the top rail extrusion 126, and it can be seen that each extrusion may be configured to include a hook portion 170, a slot portion 172, an inner tab portion 174 and an outer tab portion 176. Some of the modular components may include only some of the attachment portions listed, for example, the top rail extrusion 126 includes only the hook portion 170 and inner tab portion 174. In the illustrated embodiment, the hook portion 170 and the slot portion 172 are laterally oriented (i.e., perpendicular to the surface of the side wall 121) in opposite directions. In some embodiments, the inner and outer tab portions 174 and 176 can be configured with engagement features to enhance connection. In the illustrated embodiment, the inner tab portion 174 is configured with engagement features which are laterally outward oriented teeth 178 and the outer tab portion 176 is configured with engagement features which are laterally inward oriented teeth 180. In some embodiments, the engagement features can be structures on one or both of the connection surfaces that require the connection surfaces to approach one another from a predetermined direction. In other embodiments, the engagement features can be structures and/or surface finishes on one or both of the connection surfaces that strengthen the mechanical connection between the respective connection surfaces including, but not limited to, increasing the frictional forces between the respective connection surfaces.

In FIG. 7B, the side spacer extrusion 124 is moved vertically (i.e., parallel to the sidewall) relative to the top rail extrusion 126 to align with the top rail extrusion so that the hook portion 170 of the top rail extrusion is laterally aligned with the slot portion 172 of the side spacer extrusion, and so that the inner tab portion 174 of the top rail extrusion is laterally aligned with the outer tab portion 176 of the side spacer extrusion. This motion is denoted by arrows 302 in FIG. 7B.

In FIG. 7C, the side spacer extrusion 124 is moved laterally (i.e., perpendicular to the sidewall) relative to the top rail extrusion 126 so that the hook portion 170 engages the slot portion 172, and so that the outward-facing teeth 178 of the inner tab portion 174 engage with the inward-facing teeth 180 of the outer tab portion 176. This motion is denoted by arrows 304 in FIG. 7C. At this point, the side spacer extrusion 124 cannot be moved relative to the top rail extrusion 126 without first disengaging the hook/slot engagement (170, 172) and/or the inward/outward teeth engagement (178, 180). Because the engaged components 124, 126 are extrusions, the engaging features 170, 172, 178 and 180 run the full length of the components, thereby providing a very high strength joint between the components.

Figures 7D, 7E:
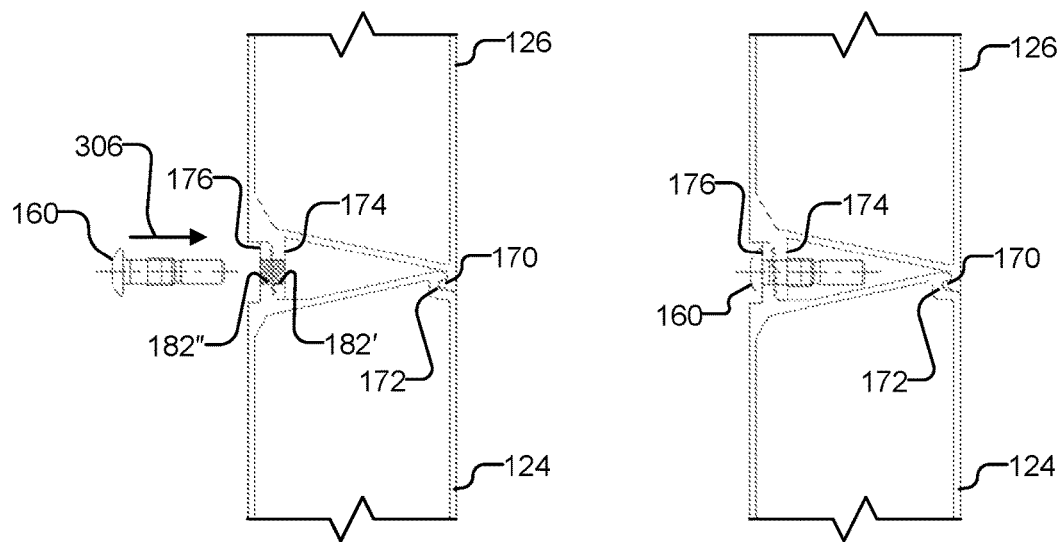

In FIG. 7D, while maintaining the engagement of the hook portion 170 to the slot portion 172, and of the outward-facing teeth 178 of the inner tab portion 174 to the inward-facing teeth 180 of the outer tab portion 176, aligned holes 182 (comprising individual holes 182' and 182") are formed through the overlapping portions of the tab portions 174, 176. In the illustrated embodiment, the aligned holes 182 are drilled in a single operation through the tab portions 174, 176 after assembly to ensure accurate alignment, but in other embodiment the holes could be pre-drilled (i.e., prior to assembly) in the tab portions. A mechanical fastener 160 can next be aligned with the holes 182 for insertion through the holes in the direction denoted by arrow 306 in FIG. 7D.

In FIG. 7E, the mechanical fastener 160 is installed in the aligned holes 182 through the overlapping portions of the tab portions 174, 176 to permanently join the two components 126 and 124. In the illustrated embodiment, the mechanical fastener 160 is a Huck® Magna-Loc® brand blind rivet, however, other types of mechanical fasteners may be used in other embodiments. The mechanical fasteners 160 may be installed at spaced-apart intervals along the tabs as required to meet strength-of-joint requirements. The mechanical fasteners prevent lateral movement of the components 124, 126 relative to one another and thus prevent disengagement of the hook/slot features (170, 172) and/or the inward/outward teeth (178, 180). The joint provided by this arrangement meets or exceeds the strength of a continuous weld and does not damage the temper of the tempered aluminum components.

Figure 7F:
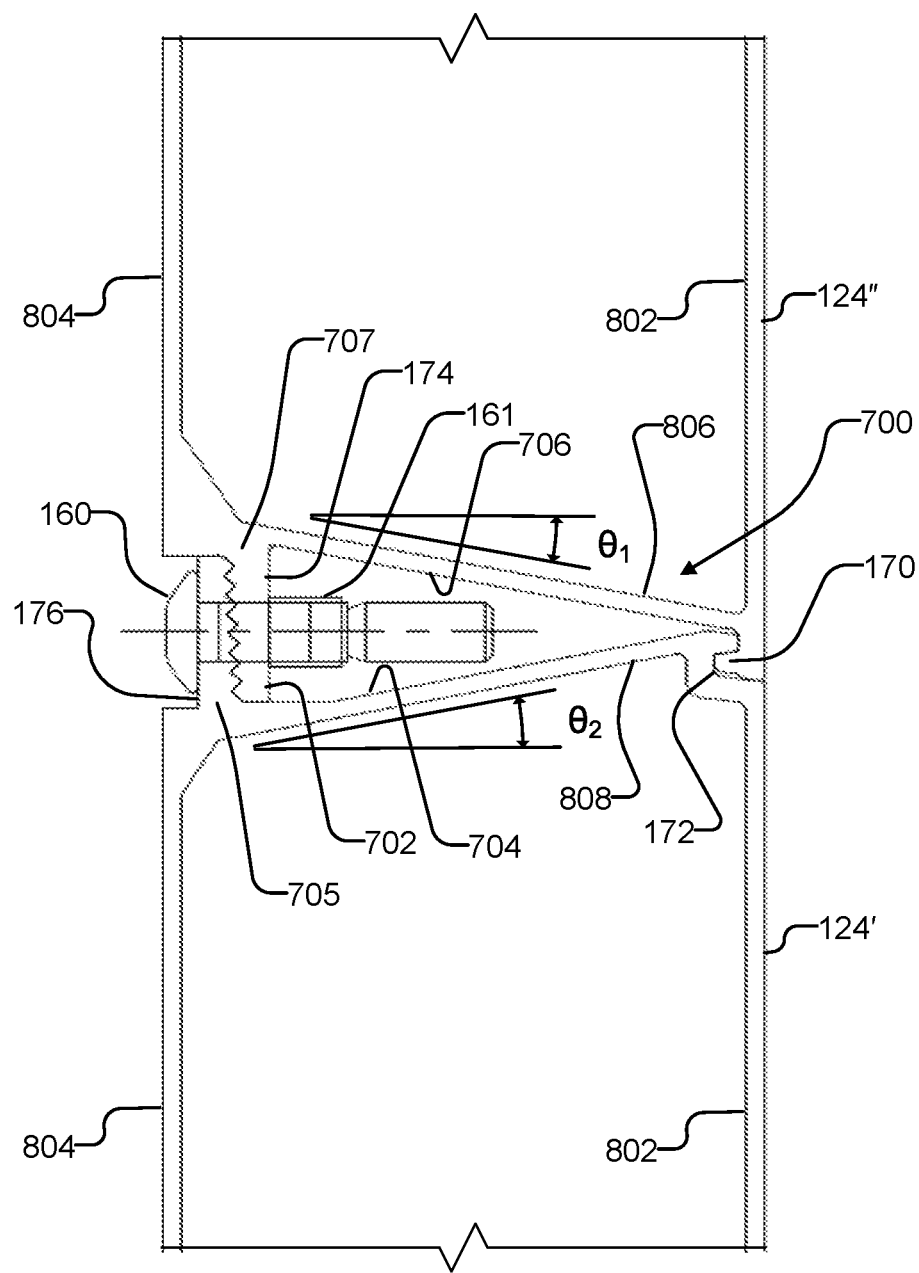
FIG. 7F is an enlarged view of the joint structure between two connected modular extrusions.

Referring now to FIG. 7F, an enlarged illustration of an exemplary connection between modular components is provided. In the illustrated embodiment, the modular components are a first side spacer extrusion 124' and a second side spacer extrusion 124"; however, the connection is substantially similar between a side spacer extrusion and a bottom rail extrusion 122, a top rail extrusion 126, a bottom headboard rail extrusion 138, or a top headboard rail extrusion 140. In particular, the bottom wall 806 of the second side spacer extrusion 124" is configured to have an angle $\theta_1$ (i.e., relative to a perpendicular line from the outer sidewall 802) between the hook portion 170 and the inner tab portion 174, and the upper wall 808 of the first side spacer extrusion 124' is configured to have an angle $\theta_2$ (i.e., relative to a perpendicular line from the outer sidewall 802) between the slot portion 172 and the outer tab portion 176. In the illustrated embodiment, the angle $\theta_1$ is about −12 to −13 degrees and the angle $\theta 2$ is about +12 to +13 degrees, however, in other embodiments the angles $\theta_1$ and $\theta 2$ can have different values. For example, in other embodiments the angle $\theta 1$ can be in the range from −15 degrees to −8 degrees and the angle $\theta 2$ can be in the range from 15 degrees to 8 degrees. The connection of the components 124' and 124" forms a triangular joint structure 700 comprising a first wall 702, a second wall 704 and a third wall 706. In the illustrated embodiment, the first wall 702 of the triangular joint 700 is formed by the engaged inner and outer tab portions 174 and 176, the second wall 704 of the triangular joint runs between a first end 705 of the first wall and the engaged hook and slot portions 170, 172, and the third wall 706 of the triangular joint runs between a second end 707 of the first wall and the engaged hook and slot portions. The triangular joint structure 700 provides increased rigidity to reduce flexing of the component connection. In the illustrated embodiment, a shaft 161 of the mechanical fastener 160 is received within the triangular joint structure 700 after connection of the components.

Referring now to FIGS. 7G-7I, an enlarged illustration of an exemplary connection between the exterior joint components, namely, the hook portion 170 and slot portion 172, of two side spacer extrusions 124' and 124" is provided, wherein the connections between other modular extrusions described herein having the hook portion 170 and slot portion 172 will be substantially identical. Referring first to FIG. 7G, the outer joint components are shown aligned (see also FIG. 7B). In the illustrated embodiment, the slot portion 172 is configured with a first taper (denoted by angle 708) and the hook portion 170 is configured with a second taper (denoted by angle 710). The first and second tapers 708 and 710 are selected to provide an increasingly tight fit as the hook portion 170 enters the slot portion 172. In addition, the hook portion 170 can be configured with a step 712 causing the distal tip 714 of the hook portion to have a further reduced height to permit easy start of assembly. Referring next to FIG. 7H, the exterior joint components are shown partially engaged, i.e., the distal end 714 of the hook portion 170 has moved laterally (see also FIG. 7C) to enter the slot portion 172 and moved past the step 712, such that the second taper 710 begins to engage the first taper 708. Referring finally to FIG. 7I, the exterior joint components are shown fully engaged (see also FIG. 7D) with the hook portion 170 tightly wedged into the slot portion 172 due to the action of the tapers 708 and 710. In the illustrated embodiment, further lateral movement is limited when the distal end 714 of the hook portion 170 reaches the proximal wall 716 of the slot portion 172 and the distal end 718 of the slot portion reaches the proximal wall 720 of the hook portion. In other embodiments, lateral movement may stop when only one of these limiting conditions occurs or when another limiting condition, e.g., interference between tapers 708 and 710 reaches a predetermined level. When the exterior joint components 170, 172 are fully engaged, loads in the outer walls 802 (denoted by arrow 722) are transmitted directly between the wall bearing surfaces at joint line 724, thus the joint components do not have to transmit vertical loads.

Referring still to FIGS. 7G-7I, although the configuration of the illustrated exterior joint components has been described herein as engagement of the hook portion 170 and the slot portion 172, the configuration can alternatively be described as a double hook and slot configuration having simultaneous engagement of two hook and slot pairs. In other words, the first hook and slot pair comprises the hook having the distal end 714 entering the slot having the proximal wall 716, and the second hook and slot pair comprises the hook having distal end 718 entering the slot having proximal wall 720. The two hook and slot pairs are adjacent to one another and both are engaged by the same lateral movement of the components being connected. In the illustrated embodiment, the second hook and slot pair are tapered in a fashion similar to tapers 708 and 710 previously described. Thus, the illustrated joint configuration can be described as a double tapered hook and tapered slot configuration.

Referring now to FIGS. 7J-7L, an enlarged illustration of an exemplary connection between the interior joint components, namely, the inner tab portion 174 and the outer tab portion 176, of two side spacer extrusions 124' and 124" is provided, wherein the connections between other modular extrusions described herein having the inner tab portion 174 and the outer tab portion 176, will be substantially identical. Referring first to FIG. 7J, the inner and outer tab portions 174 and 176 (only the outer tab portion is illustrated in FIG. 7J) can be configured to include engagement features on the opposing faces. In the illustrated embodiment, the engagement features 180 on the outer tab portion 176 are inward-facing serrations (i.e., teeth) having successive faces angled 90 degrees relative to one another and angled +/−45 degrees relative to the fastener clamping direction (denoted $F_{fastener\ clamp}$ in FIG. 7J). The inner tab portion 174 can be configured with similar (i.e., complimentary) engagement features 178 (see FIG. 7L). When so configured, the normal forces (denoted $R_{normal}$ and $R'_{normal}$ in FIG. 7J) on the 90 degree serrations in the illustrated embodiment serve to significantly increase the frictional forces parallel to the serrations (i.e., perpendicular to the view in FIG. 7J) because $R_{normal}+R'_{normal}=F_{fastener\ clamp}/(\cos 45\ \text{degrees})=F_{fastener\ clamp}\times 1.414$. Thus, friction force parallel to the serations is increased 41.4% due to the angle of the serations. In other embodiments, the first engagement features 178 on the inner tab portion 174 and the second engagement features 180 on the outer tab portion 176 can be serrations having different angles or can be different configurations.

Referring now to FIG. 7K, the inner and outer tab portions 174 and 176 (only the outer tab portion is illustrated in FIG. 7K) can be configured to taper to be thicker at the supporting end (i.e., the end connected to the bottom wall 806 or the upper wall 808) and thinner at the free end. This tapered configuration provides the cantilever of the inner and outer tab portions 174 and 176 with greater stiffness and strength at the supporting end and more flexibility at the free end. In the illustrated embodiment, the angle of taper $\theta_3$ for each of the inner and outer tab portions 174 and 176 is about 3 degrees, however, the angle of taper $\theta_3$ can have different values in other embodiments.

Referring now to FIG. 7L, the inner joint components, namely, the inner tab portion 174 and the outer tab portion 176, are shown in proximity to one another (see also FIG. 7A). The complementary first engagement features 178 and second engagement features 180 on opposing faces of the inner tab portion 174 and the outer tab portion 176 are illustrated, along with the tapered configuration of the inner and outer tab portions.

It will be appreciated that the assembly and connection examples shown in FIGS. 7A-7L are not limited to connection of the side spacer extrusion 124 to the top rail extrusion 126 or additional side spacer extrusions, but also describes the connections between other modular components described herein including, but not limited to, bottom rail extrusions 122, bottom headboard rail extrusions 138 and/or top headboard rail extrusions 140.

FIGS. 8-26 are cross-sectional extrusion drawings showing details of the modular components that can be assembled without welding to form the trailer body in accordance with further embodiments, the various drawings also comprising enlarged views illustrating details of the subject modular component and illustrating how the subject modular components interfit with adjacent modular components for modular assembly of the trailer body without welding.

Many or all of the modular components described herein are extrusions, and each such extrusion has a fixed or substantially constant cross section along viewed along the longitudinal axis, i.e., the "extrusion axis" of initial creation. Such extrusions can be cut to any desired length along the longitudinal or extrusion axis and retain the same cross section. Thus, depending on the length of extrusion needed for a particular application, some modular extrusions described herein may be shorter along the longitudinal axis than along the height axis and/or width axis. When the modular components are formed of tempered aluminum alloy, the tempering of the components can be performed before or after cutting to the desired length, because cutting (with mechanical cutting devices) does not adversely affect the temper of the material.

As previously described, many or all of the modular components described herein can be made of aluminum or aluminum alloys, and especially aluminum alloys tempered by heat treating. In addition to the alloys and/or tempering previously mentioned, the aspects and embodiments disclosed herein can be implemented using any 6000, 7000 or 9000 series aluminum alloy and any tempering further including, but not limited to, 6061, 6005, 6005A, 6063, 6463 and 6084.

Figure 8:
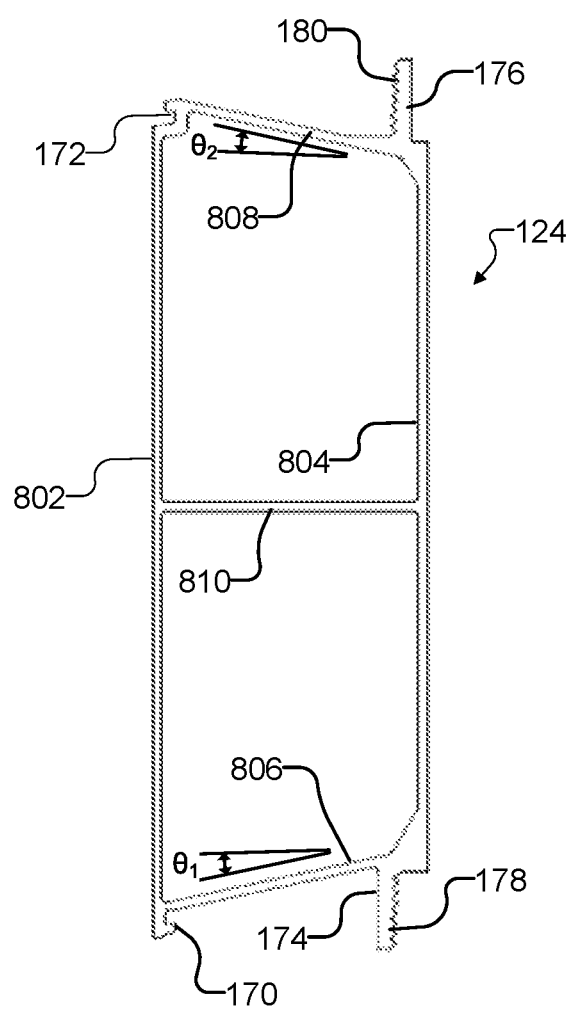

Referring now to FIG. 8, there is illustrated a modular side spacer extrusion 124 viewed in cross-section along the extrusion axis. The modular side spacer extrusion 124 can be an aluminum alloy extrusions that is tempered by heat treatment. The modular side spacer extrusion 124 can be a component of the modular assemblies for the side wall 121, the headboard 141 and/or the tailgate 118. The side spacer extrusion 124 includes an outer sidewall 802, an inner sidewall 804, a bottom wall 806 and an upper wall 808 joined together to form a box-like structure. An internal web 810 extending between the outer and inner sidewalls 802, 804 can be provided to reinforce the box-like structure. A slot portion 172 and an outer tab portion 176 can be formed at opposite ends of the upper wall 808 for connecting the side spacer extrusion 124 to compatible modular wall components, for example, additional side spacer extrusions 124 or top rail extrusions 126. In some embodiments, the upper wall 808 is configured to have an angle θ2 (i.e., relative to a perpendicular line from the outer sidewall 802) to form a triangular joint when connected to compatible components such as additional side spacer extrusions 124 or top rail extrusions 126. A hook portion 170 and an inner tab portion 174 can be formed at opposite ends of the bottom wall 806 for connecting the side spacer extrusion 124 to compatible modular wall components, for example, additional side spacer extrusions 124 or bottom rail extrusions 122. In some embodiments, the bottom wall 806 is configured to have an angle $\theta_1$ (i.e., relative to a perpendicular line from the outer sidewall 802) to form a triangular joint when connected to compatible components such as additional side spacer extrusions 124 or bottom rail extrusions 122. In the illustrated embodiments the angle $\theta_1$ is about −12 to −13 degrees and the angle $\theta_2$ is about +12 to +13 degrees, however, in other embodiments the angles $\theta_1$ and $\theta_2$ can have different values. For example, in other embodiments the angle $\theta_1$ can be in the range from −15 degrees to −8 degrees and the angle $\theta_2$ can be in the range from 15 degrees to 8 degrees.

Referring still to FIG. 8, in the illustrated embodiment, the inner tab portion 174 is tapered to be thicker at the supporting end (i.e., the end connected to the bottom wall 806) and thinner at the free end, and the outer tab portion 176 is also tapered to be thicker at the supporting end (i.e., the end connected to the upper wall 808) and thinner at the free end. This tapered configuration provides the cantilever of the inner and outer tab portions 174, 176 with greater stiffness and strength at the supporting end and more flexibility at the free end. In the illustrated embodiment, the angle of taper for each of the inner and outer tab portions 174, 176 is about 3 degrees, however, the angle of taper can have different values in other embodiments. In the illustrated embodiment, the first engagement features 178 on the inner tab portion 174 are outward-facing serrations (i.e., teeth) having successive faces angled 90 degrees relative to one another and angled +/−45 degrees relative to the fastener clamping direction, and the second engagement features 180 on the outer tab portion 176 are inward-facing serrations having successive faces angled 90 degrees relative to one another and angled +/−45 degrees relative to the fastener clamping direction. In other embodiments, the first engagement features 178 on the inner tab portion 174 and the second engagement features 180 on the outer tab portion 176 can be serrations having different angles or can be different configurations. Connection of the side spacer extrusion 124 to other compatible wall components using the slot portion 172 and outer tab portion 176 and/or the hook portion 170 and inner tab portion 174 is described in connection with FIGS. 7A-7E.

Figure 9:
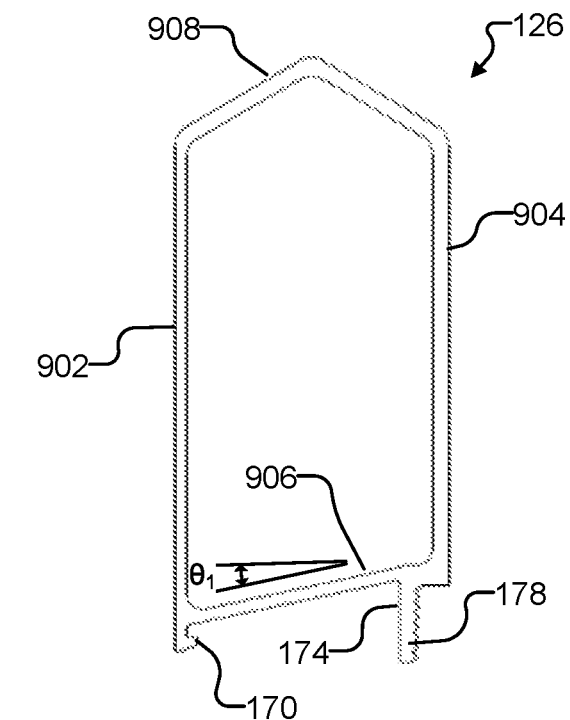

Referring now to FIG. 9, there is illustrated a modular top rail extrusion 126 viewed in cross-section along the extrusion axis. The modular top rail extrusion 126 can be a component of the modular assembly for the side wall 121. The top rail extrusion 126 includes an outer sidewall 902, an inner sidewall 904, a bottom wall 906 and an upper wall 908 joined together to form a box-like structure. In the illustrated embodiment, the upper wall 908 is peaked to minimize the accumulation of dirt/rock thereon during loading. A hook portion 170 and an inner tab portion 174 can be formed at opposite ends of the bottom wall 906 for connecting the top rail extrusion 126 to compatible modular wall components, for example, side spacer extrusions 124. In some embodiments, the bottom wall 906 is configured to have an angle $\theta_1$ (i.e., relative to a perpendicular line from the outer sidewall 902) to form a triangular joint when connected to compatible components such as side spacer extrusions 124. In the illustrated embodiments the angle $\theta_1$ is about −12 to −13 degrees, however, in other embodiments the angle $\theta_1$ can have a different value. For example, in other embodiments the angle $\theta_1$ can be in the range from −15 degrees to −8 degrees.

Referring still to FIG. 9, in the illustrated embodiment, the inner tab portion 174 is tapered to be thicker at the supporting end (i.e., the end connected to the bottom wall 906) and thinner at the free end. This tapered configuration provides the cantilever of the inner tab portion 174 with greater stiffness and strength at the supporting end and more flexibility at the free end. In the illustrated embodiment, the angle of taper the inner tab portion 174 is about 3 degrees, however, the angle of taper can have different values in other embodiments. In the illustrated embodiment, the first engagement features 178 on the inner tab portion 174 are outward-facing serrations (i.e., teeth) having successive faces angled 90 degrees relative to one another and angled +/−45 degrees relative to the fastener clamping direction. In other embodiments, the first engagement features 178 on the inner tab portion 174 can be serrations having different angles or can be different configurations. Connection of the top rail extrusion 126 to other compatible wall components using the slot portion 172 and outer tab portion 176 and/or the hook portion 170 and inner tab portion 174 is described in connection with FIGS. 7A-7E.

Figure 10:
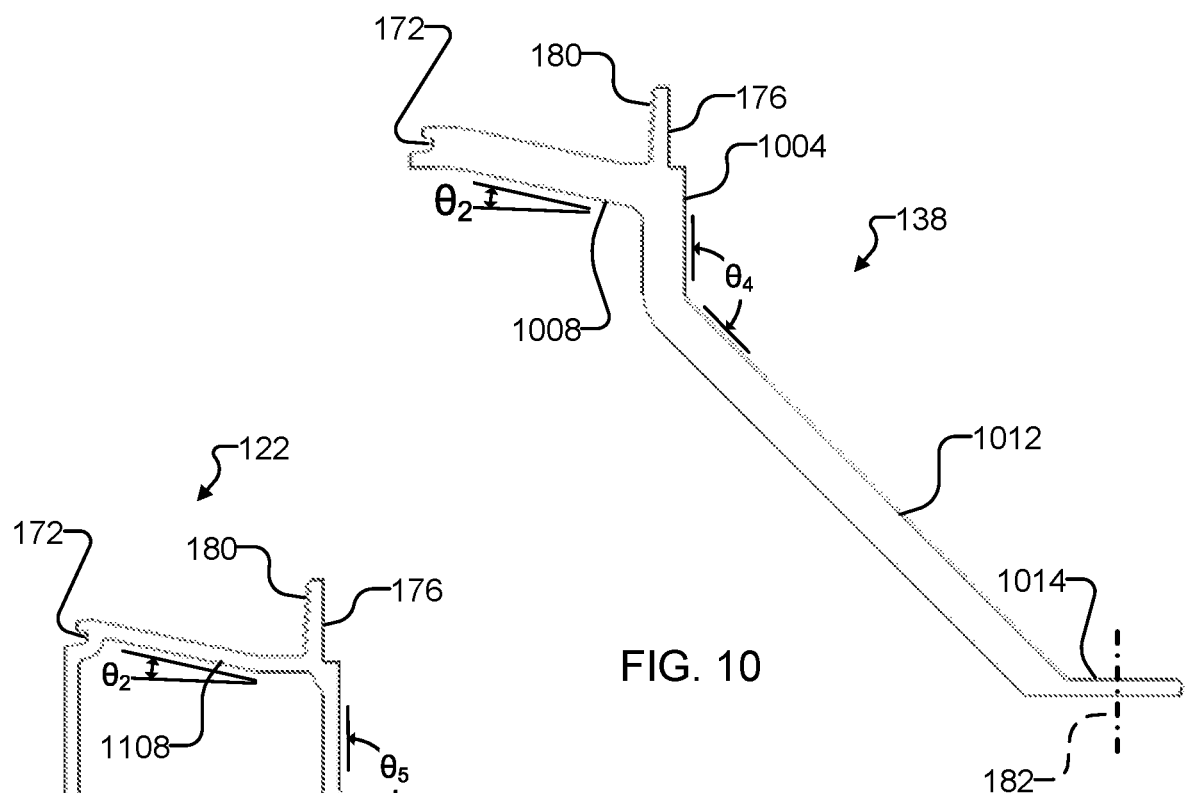

Referring now to FIG. 10, there is illustrated a modular bottom headboard extrusion 138 viewed in cross-section along the extrusion axis. The bottom headboard rail extrusion 138 generally forms the junction between the modular body headboard 141 to the modular body floor 127, and thus can be considered part of either the headboard or the floor. The bottom headboard rail extrusion 138 includes an inner stub wall 1004 and an upper wall 1008 joined together to form a L-like structure. A slot portion 172 and an outer tab portion 176 can be formed at opposite ends of the upper wall 1008 for connecting the bottom headboard rail extrusion 138 to compatible modular wall components, for example, side spacer extrusions 124. In some embodiments, the upper wall 1008 is angled with angle $\theta_2$ as previously described to form a triangular joint with compatible components such as the side spacer extrusion 124. The bottom headboard rail extrusion 138 further includes a fillet portion 1012 and a fillet tab portion 1014. The fillet portion 1012 extends down and inward at an obtuse angle $\theta_4$ from the inner stub wall 1004 to a distal end connected to the fillet tab portion 1014, and serves to connect the bottom headboard rail extrusion 138 to compatible modular floor components, for example, the floor crossmember extrusions 128, the floor plates 130 and/or the floor crossmember subframe variant (i.e., flanged) extrusions 132. the box-like structure. In the illustrated embodiment, the fillet portion 1012 extends down and inward at an angle $\theta_4$ of 45 degrees relative to the inner stub wall 1004. In other embodiments, the fillet portion 1012 extends down and inward at an angle $\theta_4$ within the range from 30 to 60 degrees relative to the inner stub wall 1004. The fillet tab portion 1014 extends horizontally (during typical use) from the distal end of the fillet portion 1012 and can be drilled for connecting the bottom headboard rail extrusion 138 to the compatible modular floor components 128, 130 and/or 132. The fillet portion 1012 also changes the interior profile of the body 102 to have an angle $\theta_4$ at the junction of the body headboard 141 and the body floor 127, thereby avoiding a right angle corner at the junction that can accumulate debris. In some embodiments, the upper wall 1008 is configured to have an angle $\theta_2$ (i.e., relative to a perpendicular line from the inner stub wall 1004) to form a triangular joint when connected to compatible components such as side spacer extrusions 124. In the illustrated embodiment the angle $\theta_2$ is about +12 to +13 degrees, however, in other embodiments the angle $\theta_2$ can have different a value. For example, in other embodiments the angle $\theta_2$ can be in the range from 15 degrees to 8 degrees.

Referring still to FIG. 10, in the illustrated embodiment, the outer tab portion 176 is also tapered to be thicker at the supporting end (i.e., the end connected to the upper wall 1008) and thinner at the free end. This tapered configuration provides the cantilever of the outer tab portion 176 with greater stiffness and strength at the supporting end and more flexibility at the free end. In the illustrated embodiment, the angle of taper for the outer tab portion 176 is about 3 degrees, however, the angle of taper can have different values in other embodiments. In the illustrated embodiment, the second engagement features 180 on the outer tab portion 176 are inward-facing serrations having successive faces angled 90 degrees relative to one another and angled +/−45 degrees relative to the fastener clamping direction. In other embodiments, the second engagement features 180 on the outer tab portion 176 can be serrations having different angles or can be different configurations. Connection of the bottom headboard rail extrusion 138 to other compatible headboard components using the slot portion 172 and outer tab portion 176 and/or the hook portion 170 and inner tab portion 174 is described in connection with FIGS. 7A-7E.

Figure 28:
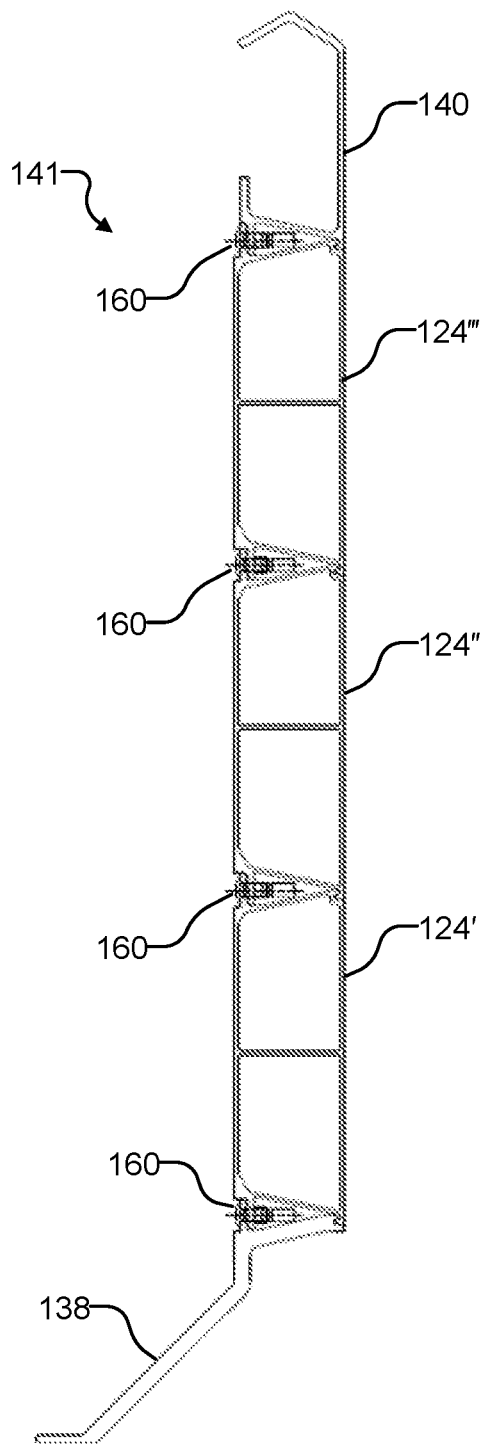
FIG. 28 is a partial side elevation view of an exemplary modular headboard.

For further understanding, FIG. 28 illustrates an exemplary modular headboard 141 showing connection of the bottom headboard rail extrusion 138 to a side spacer extrusion 124.

Figure 11:
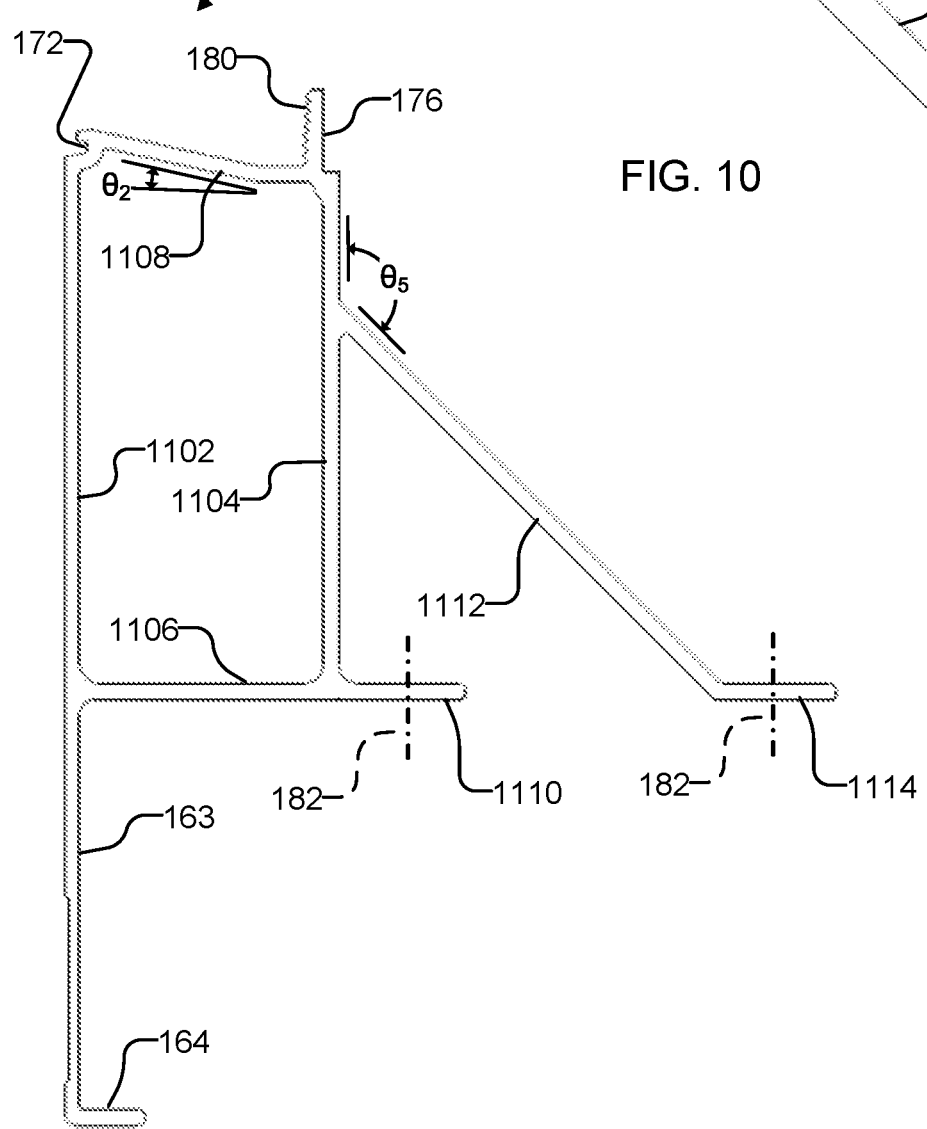

Referring now to FIG. 11, there is illustrated a modular bottom rail extrusion 122 viewed in cross-section along the extrusion axis. The bottom rail extrusion 122 generally forms the junction between the body side wall 121 to the body floor 127, and thus can be considered part of either the wall or the floor. The bottom rail extrusion 122 includes an outer sidewall 1102, an inner sidewall 1104, a bottom wall 1106 and an upper wall 1108 jointed together to form a box-like structure. A slot portion 172 and an outer tab portion 176 can be formed at opposite ends of the upper wall 1108 for connecting the bottom rail extrusion 122 to compatible modular wall components, for example, side spacer extrusions 124. In some embodiments, the upper wall 1108 is angled with angle $\theta_2$ as previously described to form a triangular joint with compatible components such as the side spacer extrusion 124. The skirt portion 163 of the bottom rail extrusion extends downward from the box-like structure and is terminated with the lip 164.

Referring still to FIG. 11, the bottom rail extrusion 122 further includes a sidewall tab portion 1110, a fillet portion 1112 and a fillet tab portion 1114. The sidewall tab portion 1110 extends horizontally (during typical use) from the bottom wall 1106. Holes 182 (denoted by dashed lines) can be drilled in the sidewall tab portion 1110 for connecting, e.g., with mechanical fasteners 162, the bottom rail extrusion 122 to compatible modular floor components, for example, the floor crossmember extrusions 128, the floor plates 130 and/or the floor crossmember subframe variant (i.e., flanged) extrusions 132. The fillet portion 1112 extends down and inward at an obtuse angle $\theta_5$ from an upper portion of the inner sidewall 1104 to a distal end, and serves to connect the fillet tab portion 1114 to the box-like structure. In the illustrated embodiment, the fillet portion 1112 extends down and inward at an angle $\theta_5$ of 45 degrees relative to the inner sidewall 1104. In other embodiments, the fillet portion 1112 extends down and inward at an angle $\theta_5$ within the range from 30 to 60 degrees relative to the inner sidewall 1104. The fillet tab portion 1114 extends horizontally (during typical use) from the distal end of the fillet portion 1112 substantially in-line with the sidewall tab portion 1110. Holes 182 can also be drilled in the fillet tab 1114 for further connecting, e.g., with bolts, rivets or other mechanical fasteners 162, the bottom rail extrusion 122 to compatible modular floor components 128, 130 and/or 132. As best seen in FIG. 4, the fillet portion 1112 also changes the interior profile of the body 102 to have an angle $\theta_5$ at the junction of the modular sidewall 121 and the modular body floor 127, thereby avoiding a right angle corner at the junction that can accumulate debris.

For further understanding, FIG. 4 illustrates an exemplary modular side wall 121 and a modular floor 127 showing connection of the bottom rail extrusion 122 to the other components of the modular assemblies.

Referring now to FIG. 12, there is illustrated a modular floor crossmember extrusion 128 viewed in cross-section along the extrusion axis. The floor crossmember extrusions 128 can be used to form the modular floor 127. The floor crossmember extrusion 128 includes an upper plate 1202, a bottom plate 1204 and two side plates 1206 forming a box-like structure. In the illustrated embodiment, the box-like structure is trapezoidal in cross section. A slot portion 1208 is formed at the junction of each side plate 1206 with the top plate 1202, and a tab portion 1210 extends outwardly from each slot portion. The slot portions 1208 are configured with slots or grooves. In some embodiments, the slots or grooves of the slot portions 1208 are canted outward from the top plate 1202. The tab portions 1210 extend substantially parallel to the upper plate 1202, but are displaced downward by a distance d. In some embodiments, the distance d is equal to the thickness of the floor plates extrusions 130 (FIG. 13) so that the modular floor 127 has a flush upper surface. Holes 182 (denoted by dashed lines) can be drilled through the tab portion 1210 for permanently connecting the floor crossmember extrusion 128 to compatible modular floor components, e.g., with bolts, rivets or other mechanical fasteners 162.

Regarding the trapezoidal shape of the floor crossmember extrusions 128 illustrated in FIG. 12, and also present on the subframe crossmembers 132 (FIG. 14) and subframe longmembers 136 (FIG. 21), the trapezoidal shape is very effective to transfer the suspension loads of the dump body 102. The side plates, e.g., 1206, 1406 and 2104, are angled to function somewhat like a truss, but the top and bottom plates, e.g., 1202, 1204, 1402, 1404, 2102 and 2106, are flat to allow for bolting or other fastening. The suspension loads in the dump body 102 are complex, in that they are vertical, longitudinal and lateral. These loads are also cyclical or variable. Vertical loads are from weight, longitudinal loads are from braking (mostly pulling the axles rearward relative to the body) and dumping (pushing the rear axle forward, a reverse direction from braking), and transverse loads are from going around curves. Especially severe are the loads from lateral scuffing during tight maneuvering turns. The trapezoidal shape of the floor crossmember extrusions 128, subframe crossmembers 132 and subframe longmembers 136 act to resist distortion of the dump body 102 when such various loads are encountered.

Figure 27:
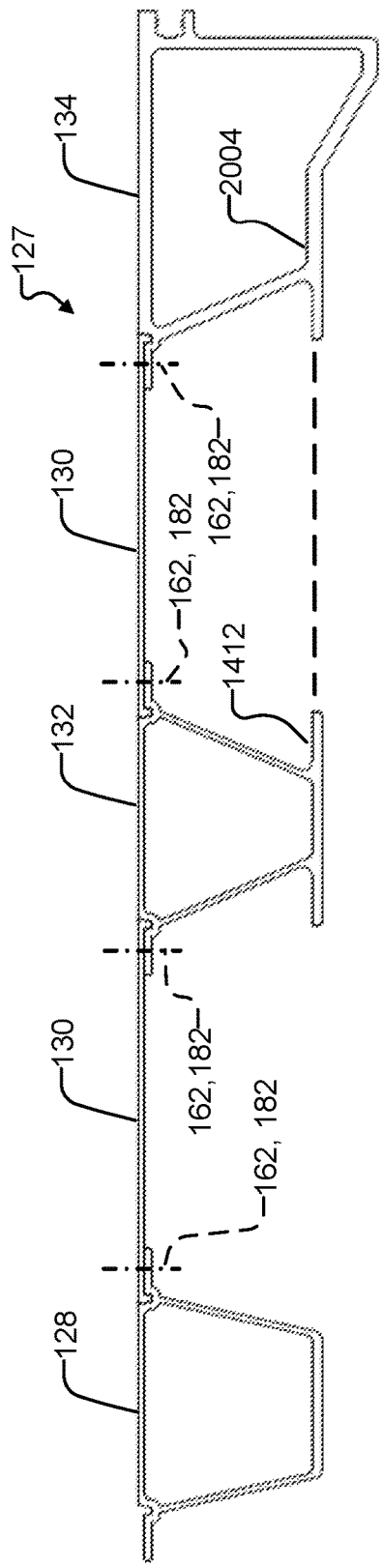
FIG. 27 is a partial side elevation view of an exemplary modular floor.

For further understanding, FIGS. 6 and 27 illustrates exemplary modular floors 127 showing connection of the floor crossmember extrusion 128 to other components of the modular floor and/or modular sidewall.

Referring now to FIG. 13, there is illustrated a modular floor plate extrusion 130 viewed in cross-section along the extrusion axis. The floor plate extrusions 130 can be used to form the modular floor 127. The floor plate extrusion 130 includes a central plate portion 1302 and a pair of hook portions 1304 disposed on the lateral ends of the plate portion. The plate portion 1302 has a thickness t. The hook portions 1304 are configured to interfit in the slots or grooves of compatible modular floor components including, but not limited to, the slot portions 1208, 1408 and 2008, respectively, of the floor crossmember extrusions 128, floor crossmember subframe variant extrusions 132 (FIG. 14) and floor rear sill extrusions 134 (FIG. 20). In some embodiments, the hook portions are canted inward from the plate portion 1302 to better interfit with outward canted slot portions of the compatible floor components 128, 132 and 134. In some embodiments, the thickness t of the plate portion 1302 is equal to the downward displacement d of the tab portions 1210, 1410 or 2010 on the compatible floor components 128, 132 and 134 so that the modular floor 127 has a flush upper surface. The floor plate extrusions 130 can be permanently joined to the compatible floor components 128, 132 and 134 by drilling holes 182 (denoted by dashed lines) through the plate portion 1302 where it overlaps the tab portions 1210, 1410 or 2010, inserting a mechanical fastener 162 through the holes and then fastening overlying portions together with the fastener.

For further understanding, FIGS. 6 and 27 illustrates exemplary modular floors 127 showing connection of the floor plate extrusion 130 to other components of the modular floor and/or modular sidewall.

Referring now to FIG. 14, there is illustrated a modular floor crossmember subframe variant extrusion 132 viewed in cross-section along the extrusion axis. The floor crossmember subframe variant extrusions 132 can be used to form the modular floor 127 and also to form the subframe 104. The floor crossmember subframe variant extrusion 132 includes an upper plate 1402, a bottom plate 1404 and two side plates 1406 forming a box-like structure. In the illustrated embodiment, the box-like structure is trapezoidal in cross section. A slot portion 1408 is formed at the junction of each side plate 1406 with the top plate 1402, and a tab portion 1410 extends outwardly from each slot portion. The slot portions 1408 are configured with slots or grooves. In some embodiments, the slots or grooves of the slot portions 1408 are canted outward from the top plate 1402. The tab portions 1410 extend substantially parallel to the upper plate 1402, but are displaced downward by a distance d. In some embodiments, the distance d is equal to the thickness of the floor plates extrusions 130 so that the modular floor 127 has a flush upper surface. Holes 182 (denoted by dashed lines) can be drilled through the tab portion 1410 for permanently connecting the floor crossmember subframe variant extrusion 128 to compatible modular floor components, e.g., with bolts, rivets or other mechanical fasteners 162. The floor crossmember subframe variant extrusion 132 further includes flanges 1412 extending outwardly from each side of the bottom plate 1404. The flanges 1412 provide greater structural stiffness to the floor crossmember subframe variant extrusion 132 and to modular assemblies made therefrom. In addition, the flanges 1412 provide surfaces for attachment of other components by means of drilling additional holes 182' in the flanges, inserting mechanical fasteners 162 through the holes and then fastening overlying components together with the fasteners.

For further understanding, FIGS. 1 and 27 illustrates exemplary modular subframe 104 and modular floor 127 showing connection of the floor crossmember subframe variant extrusion 132 to other components of the modular floor and/or modular subframe.

Figure 15:
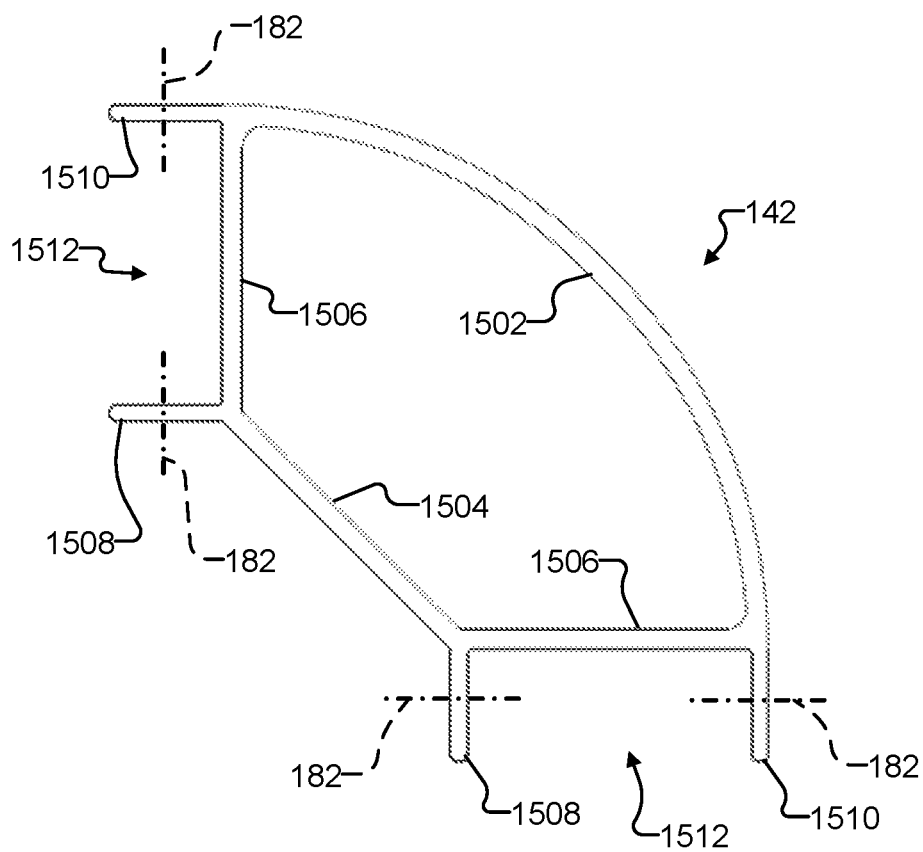

Referring now to FIG. 15, there is illustrated a modular front corner post extrusion 142 viewed in cross-section along the extrusion axis. The modular front corner post extrusion 142 serves as a junction between the modular side wall 121 and the modular headboard 141. The front corner post extrusion 142 includes an outer sidewall 1502, an inner sidewall 1504 and two end walls 1506 joined together to form a 90 degree elbow-like structure. Inner and outer tab walls 1508 and 1510, respectively, extend from the end walls 1506 to form a square socket 1512 at each end of the front corner post extrusion 142. A modular side wall 121 can be inserted into one of the square sockets 1512 and a modular headboard 141 can be inserted into the other square socket. After insertion into the square sockets 1512, the modular side wall 121 and modular headboard 141 can be permanently connected to the front corner post extrusion 142 (and thus to one another) by drilling holes 182 (denoted by dashed lines) through the inner and/or outer tab walls 1508 and 1510 and the underlying portions of the modular sidewall and/or headboard (i.e., the portions in the sockets 1512), and then inserting and fastening mechanical fasteners 160 and/or 162 including, but not limited to, bolts and rivets.

Figure 16:
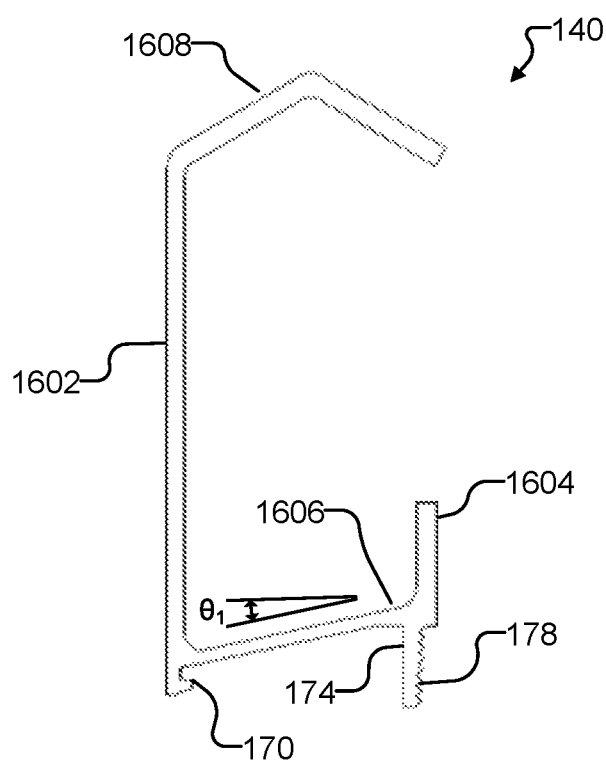

Referring now to FIG. 16, there is illustrated a modular top headboard rail extrusion 140 viewed in cross-section along the extrusion axis. The modular top rail extrusion 140 can be a component of the modular assembly for the headboard 141. The top headboard rail extrusion 140 includes an outer sidewall 1602, an inner sidewall 1604, a bottom wall 1606 and an upper wall 1608 joined together to form a C-like structure. In the illustrated embodiment, the upper wall 1608 is peaked to minimize the accumulation of dirt/rock thereon during loading. A hook portion 170 and an inner tab portion 174 can be formed at opposite ends of the bottom wall 1606 for connecting the top headboard rail extrusion 140 to compatible modular headboard components, for example, side spacer extrusions 124. In some embodiments, the bottom wall 1606 is configured to have an angle $\theta_1$ (i.e., relative to a perpendicular line from the outer sidewall 1602) to form a triangular joint when connected to compatible components such as side spacer extrusions 124. In the illustrated embodiments the angle $\theta_1$ is about −12 to −13 degrees, however, in other embodiments the angle $\theta_1$ can have a different values. For example, in other embodiments the angle $\theta_1$ can be in the range from −15 degrees to −8 degrees.

Referring still to FIG. 16, in the illustrated embodiment, the inner tab portion 174 is tapered to be thicker at the supporting end (i.e., the end connected to the bottom wall 906) and thinner at the free end. This tapered configuration provides the cantilever of the inner tab portion 174 with greater stiffness and strength at the supporting end and more flexibility at the free end. In the illustrated embodiment, the angle of taper the inner tab portion 174 is about 3 degrees, however, the angle of taper can have different values in other embodiments. In the illustrated embodiment, the first engagement features 178 on the inner tab portion 174 are outward-facing serrations (i.e., teeth) having successive faces angled 90 degrees relative to one another and angled +/−45 degrees relative to the fastener clamping direction. In other embodiments, the first engagement features 178 on the inner tab portion 174 can be serrations having different angles or can be different configurations. Connection of the top headboard rail extrusion 140 to other compatible headboard components using the slot portion 172 and outer tab portion 176 and/or the hook portion 170 and inner tab portion 174 is described in connection with FIGS. 7A-7E.

For further understanding, FIG. 28 illustrates an exemplary modular headboard 141 showing connection of the top rail extrusion 140 to the other components of the modular headboard.

Figure 17:
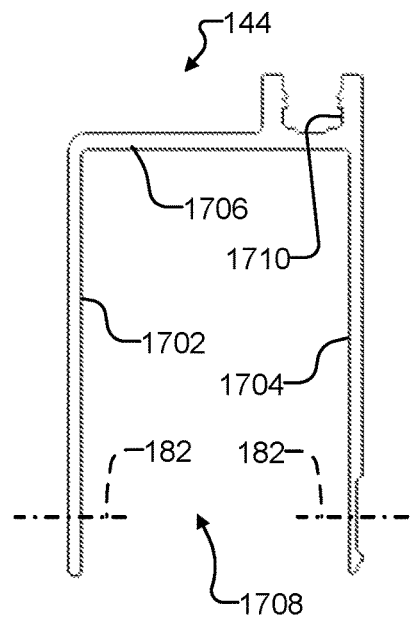

Referring now to FIG. 17, there is illustrated a modular rear cap extrusion 144 viewed in cross-section along the extrusion axis. The modular rear cap extrusion 144 can be a component of the modular side wall 121. The modular rear cap extrusion 144 includes outer sidewall 1702, inner sidewall 1704 and end wall 1706 joined together to form rectangular socket 1708 for receiving the rear edge of the modular sidewall. The rear cap extrusion 144 can be permanently connected to the modular side wall components 122, 124 and 126 by drilling holes 182 (denoted by dashed lines) through the sidewalls 1702 and/or 1704 and the underlying modular wall components (i.e., the portions within the socket 1708) and then inserting and fastening mechanical fasteners 160 and/or 162 including, but not limited to, bolts and rivets. In the illustrated embodiment, the end wall 1706 includes a socket 1710 for receiving and holding a flexible tailgate seal (not shown).

Figure 18:
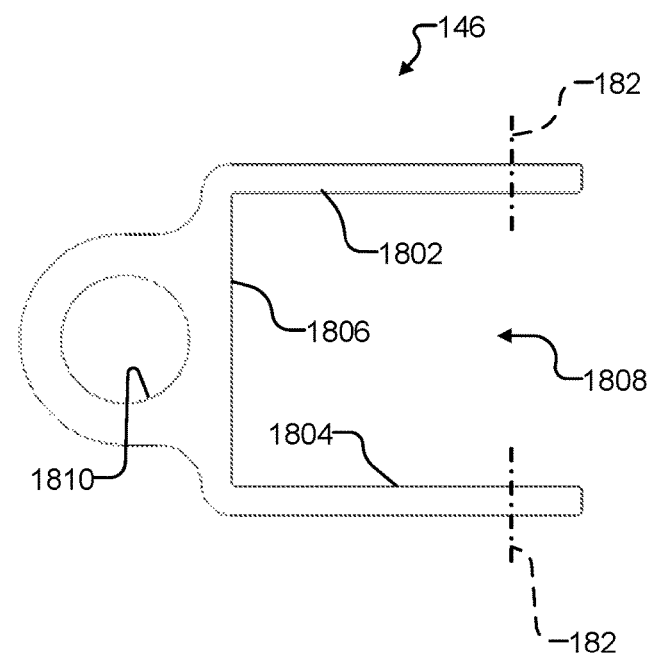

Referring now to FIG. 18, there is illustrated a modular draft arm bearing block extrusion 146 viewed in cross-section along the extrusion axis. The modular draft arm bearing block extrusion 146 can be a component of the draft arm assembly 116. The modular draft arm bearing block extrusion 146 includes sidewalls 1802 and 1804 and end wall 1806 joined together to form a square socket 1808 for receiving draft arm components such as the draft arm tube extrusion 154. The end wall 1806 includes a bearing hole 1810 for rotatably attaching the draft arm 116 to the trailer body 102. The draft arm bearing block extrusion 146 can be permanently connected to the modular draft arm components by drilling holes 182 (denoted by dashed lines) through the sidewalls 1802 and/or 1804 and the underlying modular draft arm components (i.e., the portions within the socket 1808) and then inserting and fastening mechanical fasteners 160 and/or 162 including, but not limited to, bolts and rivets.

Figure 19:
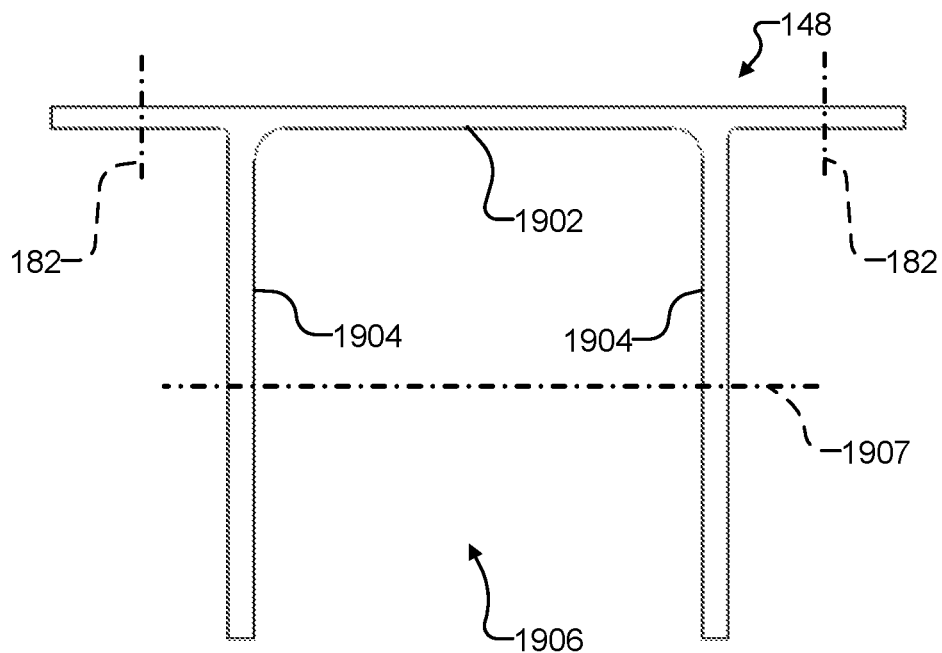

Referring now to FIG. 19, there is illustrated a modular draft arm bracket extrusion 148 viewed in cross-section along the extrusion axis. The modular draft arm bracket extrusion 148 is used to connect the modular draft arm assemblies 116 to the underside of the modular floor 127. The draft arm bracket extrusion 148 includes a base plate 1902 and a pair of parallel side walls 1904 depending from a central portion of the base plate to form a structure resembling a Greek letter "pi". The base plate 1902 can be connected to the underside of the modular floor 127 using holes 182 and mechanical fasteners 160 and/or 162 including, but not limited to, bolts and rivets. The side walls 1904 can be machined for receiving a draft arm bearing (denoted by bearing axis line 1907) for pivoting attachment of a draft arm bearing block formed from the draft arm bearing block extrusion 146.

For further understanding, FIGS. 1 and 2 illustrate a draft arm bracket extrusion 148 connected to the floor of the dump body 102 to make a pivoting connection with the draft arm assemblies 116.

Referring now to FIG. 20, there is illustrated a modular rear apron (sill) extrusion 134 viewed in cross-section along the extrusion axis. The modular rear apron extrusion 134 can be used with the other modular floor components, e.g., 128, 130, 132, to form the modular floor 127. The rear apron extrusion 134 is typically the rearmost component of the modular floor 127. The rear apron extrusion 134 includes an upper plate 2002, a bottom plate 2004, a rear sill wall 2005 and a front wall 2006 forming a box-like structure. In the illustrated embodiment, the bottom plate 2004 includes a dog-leg 2007 that allows the front portion of the bottom plate to be in line (denoted by dashed line in FIG. 27) with the flanges 1412 of the floor crossmember subframe variant extrusion 132. This provides a level surface for attachment of components for the modular subframe 104. Further in the illustrated embodiment, the front wall 2006 is angled similar to the trapezoidal side plates 1206 of the modular floor crossmember extrusion 128. A slot portion 2008 is formed at the junction of the top plate 2002 with the front wall 2006, and a tab portion 2010 extends outwardly from the slot portion. The slot portion 2008 is configured with slots or grooves. In some embodiments, the slots or grooves of the slot portion 2008 are canted outward from the top plate 2002. The tab portion 2010 extends substantially parallel to the upper plate 2002, but is displaced downward by a distance d. In some embodiments, the distance d is equal to the thickness of the floor plates extrusions 130 (FIG. 13) so that the modular floor 127 has a flush upper surface. Holes 182 (denoted by dashed lines) can be drilled through the tab portion 2010 for permanently connecting the rear apron extrusion 134 to compatible modular floor components, e.g., floor plate extrusions 130, with bolts, rivets or other mechanical fasteners 162. In the illustrated embodiment, the rear face of the rear sill wall 2005 further includes a socket 2012 for receiving and holding a flexible tailgate seal (not shown).

For further understanding, FIG. 27 illustrates an exemplary modular floor 127 showing connection of the rear apron extrusion 134 to the other components of the modular floor 127.

Figure 21:
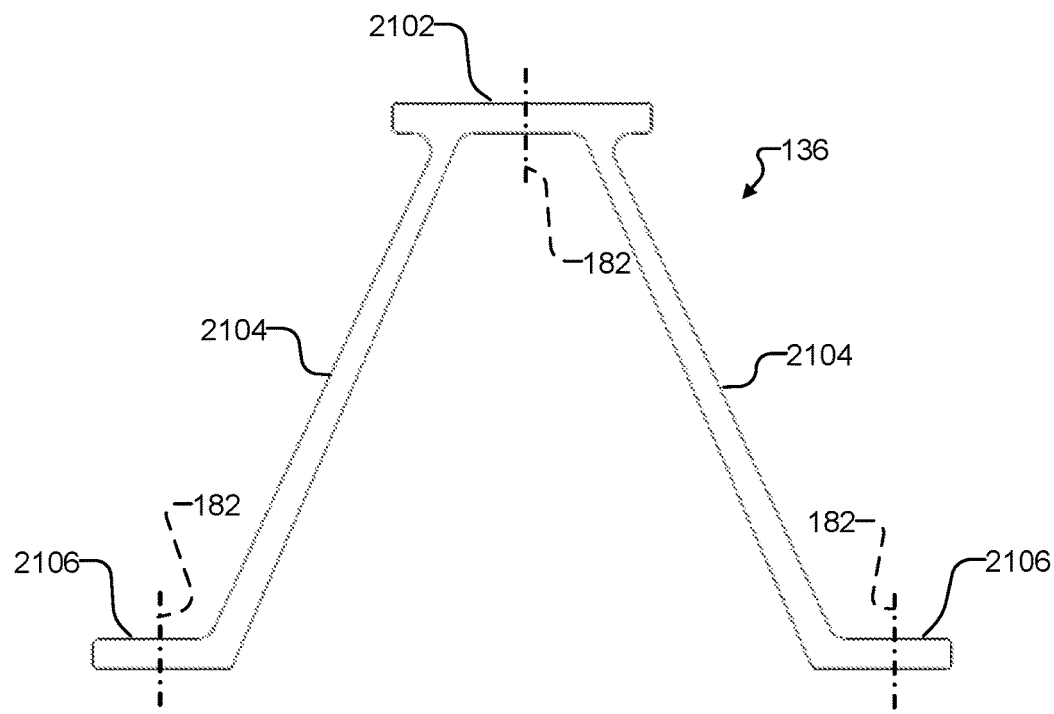
Figure 35:
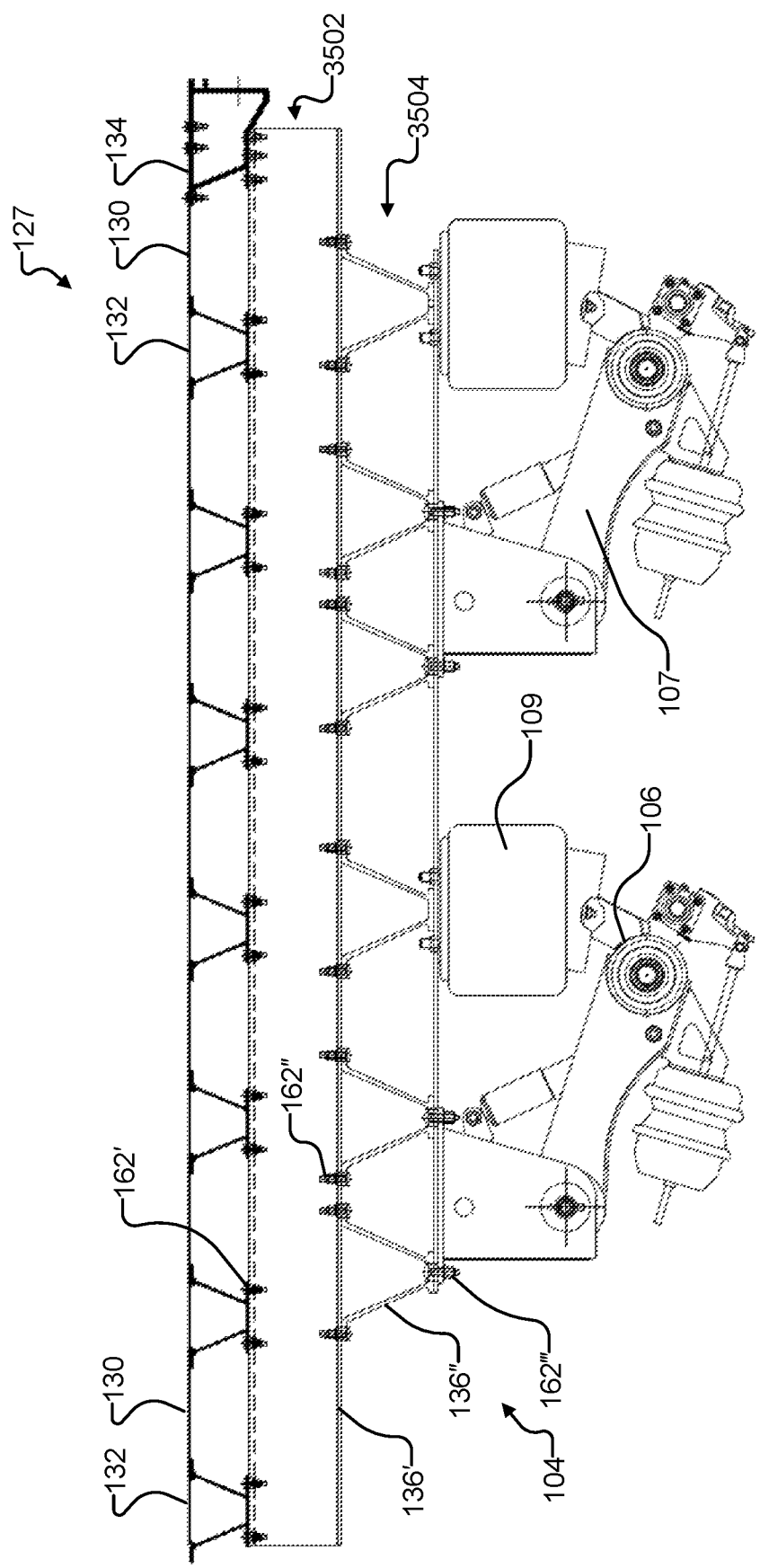
FIG. 35 is a partial side elevation view of an exemplary modular floor and modular subframe with attached running gear.

Referring now to FIG. 21, there is illustrated a modular subframe extrusion 136 viewed in cross-section along the extrusion axis. The modular subframe extrusion 136 can be used to form the subframe 104. For example, as best seen in FIGS. 1, 2 and 35, a first subframe layer comprising multiple subframe extrusions 136 oriented longitudinally (i.e., parallel to the centerline of the body 102) can be positioned beneath the floor crossmember subframe variant extrusions 132 (which are oriented transversely, i.e., perpendicular to the centerline of the body) which form the rear portion of the modular body floor 127. A second subframe layer comprising further subframe extrusions 136 (but inverted and transversely oriented) can be positioned below the subframe extrusions of the first layer to mount the running gear, e.g., links 107, axles 106 and air springs 109. The subframe extrusion 136 includes an upper plate 2102 and a pair of downlegs 2104, with each downleg having a downleg tab portion 2106 formed at the distal end. In the illustrated embodiment, the downlegs 2104 are angled apart moving away from the upper plate 2102 to give the subframe extrusion 136 an inverted-V type structure. The configuration can be inverted (i.e., to a V-type structure) for the second subframe layer. The downleg tab portions 2106 are typically oriented laterally in-line with one another. Holes 182 (denoted by dashed lines) can be drilled through the top plate 2102 and downleg tab portions 2104 for permanently connecting the subframe extrusions 136 with bolts, rivets or other mechanical fasteners 162 to compatible modular floor components above, e.g., floor crossmember subframe variant extrusions 132, and to the running gear components below.

For further understanding, FIGS. 1 and 2 illustrate exemplary modular subframe 104 showing connection of the subframe extrusion 136 to other components of the modular subframe.

Figure 22:
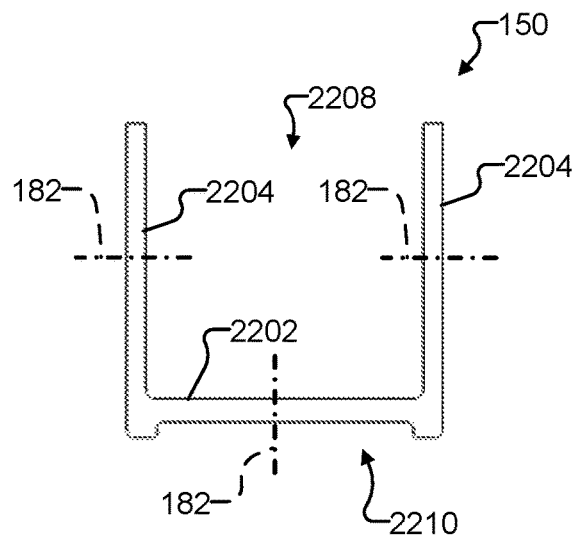
Figure 25:
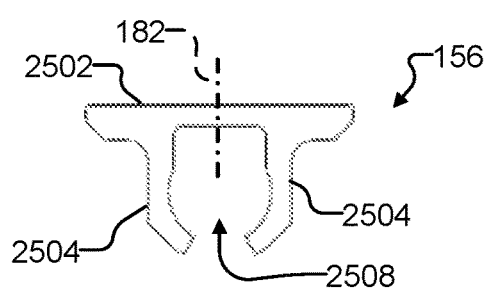

Referring now to FIG. 22, there is illustrated a modular tailgate frame extrusion 150 viewed in cross-section along the extrusion axis. The modular tailgate frame extrusion 150 can be a component of the modular tailgate 118. The tailgate frame extrusion 150 includes an end wall 2202 and a pair of sidewalls 2204 joined together to form rectangular socket 2208 for receiving the edge of the other modular tailgate components, e.g., side spacer extrusions 124. In the illustrated embodiment, the end wall 2202 includes a outer recess 2210 for receiving a modular tailgate pin housing extrusion 156 (FIG. 25). The tailgate frame extrusion 150 can be permanently connected to the modular tailgate components, e.g., side spacer extrusions 124 and tailgate pin housing extrusion 156, by drilling holes 182 (denoted by dashed lines) through the end wall 2202 and/or sidewalls 2204 and the underlying modular wall components (i.e., the portions within the socket 2208 or outer socket/recess 2210) and then inserting and fastening mechanical fasteners 160 and/or 162 including, but not limited to, bolts and rivets.

Figure 30:
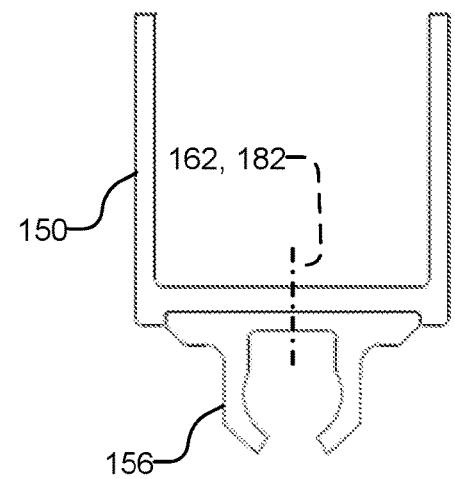
FIG. 30 is a cross-sectional view showing the tailgate pin housing extrusion interfitting with the tailgate frame extrusion.

For further understanding, FIG. 30 illustrates an exemplary subassembly showing connection of the tailgate frame extrusion 150 to other components of the modular tailgate.

Figure 23:
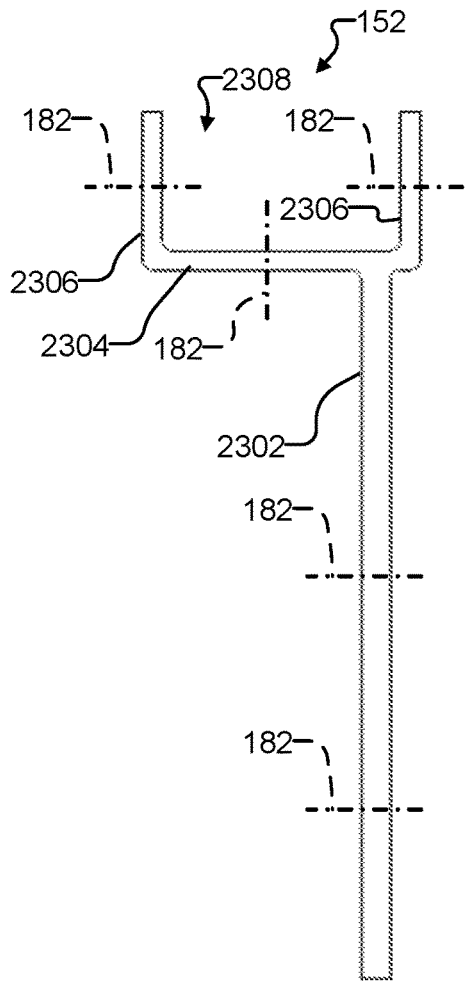

Referring now to FIG. 23, there is illustrated a modular landing gear mount flange extrusion 152 viewed in cross-section along the extrusion axis. The modular landing gear mount flange extrusion 152 can be a component of the draft arm assembly 116. The landing gear mount flange extrusion 152 can be attached to the draft arm tube extrusion 154 to mount a landing gear strut (not shown). The landing gear mount flange extrusion 152 includes a mounting plate 2302 connected to an end plate 2304. A pair of parallel sidewalls 2306 extend perpendicularly from the ends of the end plate 2304 to form a rectangular socket 2308. The socket 2308 can receive a draft arm tube extrusion 154 and the landing gear can be mounted on the mounting plate 2302. The landing gear mount flange extrusion 152 can be permanently connected to the landing gear and to modular draft arm components by drilling holes 182 (denoted by dashed lines) through the mounting plate 2302 and the underlying landing gear (i.e., the portions adjacent to the mounting plate) and/or through the sidewalls 2306 and the underlying modular draft arm components (i.e., the portions within the socket 2308) and then inserting and fastening mechanical fasteners 160 and/or 162 including, but not limited to, bolts and rivets.

Figure 29:
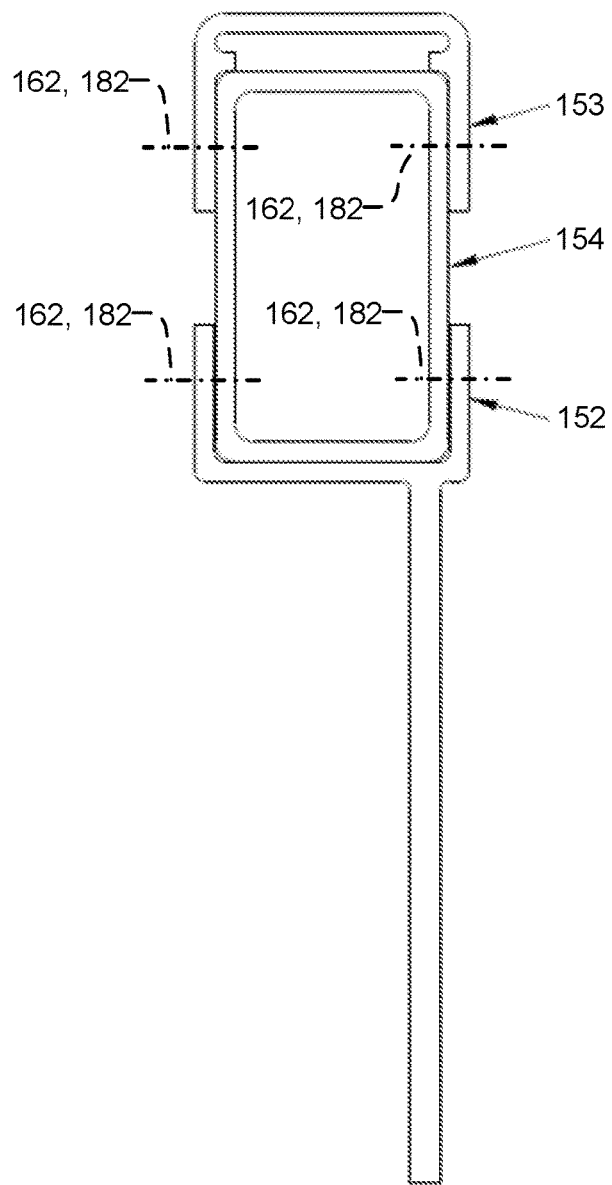
FIG. 29 is a cross-sectional view of an exemplary landing gear mounting assembly.

For further understanding, FIG. 29 illustrates an exemplary subassembly showing connection of the landing gear mount flange extrusion 152 to other components of the modular drawbar assembly.

Figure 24:
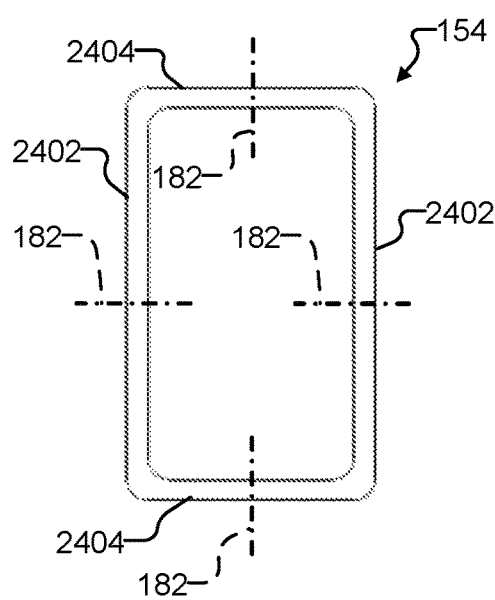

Referring now to FIG. 24, there is illustrated a modular draft arm tube extrusion 154 viewed in cross-section along the extrusion axis. The draft arm tube extrusion 154 can be a component of the draft arm assembly 116. The draft arm tube extrusions 154 is the primary component of the draft arms 116 and can also be used for the draft arm crossmembers (not shown). In the illustrated embodiment, the draft arm tube extrusion 154 includes a pair of side walls 2402 and a pair of connecting walls 2404 connected to form a rectangular structure. The draft arm tube extrusion 154 can be permanently connected to the other modular draft arm components, e.g., 146, 148, 152 and 153 by drilling holes 182 (denoted by dashed lines) through the side walls 2402 and/or the connecting walls 2404 the underlying draw bar components and then inserting and fastening mechanical fasteners 160 and/or 162 including, but not limited to, bolts and rivets.

For further understanding, FIG. 29 illustrates an exemplary subassembly showing connection of the draft arm tube extrusion 154 to other components of the modular drawbar assembly.

Referring now to FIG. 25, there is illustrated a modular tailgate pin housing extrusion 156 viewed in cross-section along the extrusion axis. The tailgate pin housing extrusion 156 can be a component of the modular tailgate 118. The tailgate pin housing extrusion 156 includes an end wall 2502 and a pair of prongs 2504 extending from the rear side of the end wall to form a circular socket 2508 for receiving a round (i.e., cylindrical) tailgate pin (not shown). The tailgate pin housing extrusion 156 can be configured to fit within the outer socket/recess 2210 of the tailgate frame extrusion 150. The tailgate pin housing extrusion 156 can be permanently connected to the tailgate frame extrusion 150 by drilling holes 182 (denoted by dashed lines) through the end wall 2502 and the underlying end wall 2202 of the tailgate frame extrusion 150 and then inserting and fastening mechanical fasteners 160 and/or 162 including, but not limited to, bolts and rivets.

For further understanding, FIG. 30 illustrates an exemplary subassembly showing connection of the tailgate pin housing extrusion 156 to other components of the modular tailgate.

Figure 26:
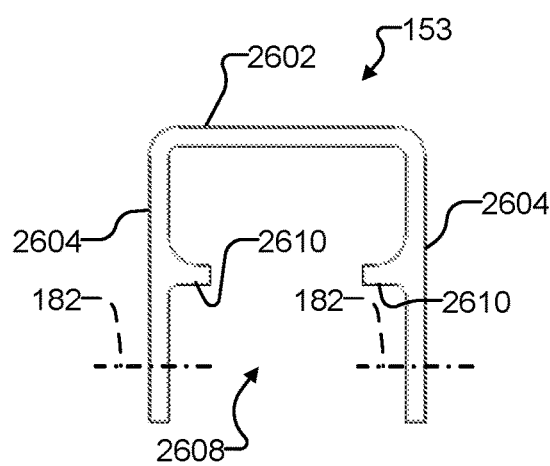
FIG. 26 is a cross-sectional extrusion drawing of the landing gear cap extrusion for the modular draft arm assembly.

Referring now to FIG. 26, there is illustrated a modular landing gear cap extrusion 153 viewed in cross-section along the extrusion axis. The modular landing gear cap extrusion 153 can be a component of the draft arm assembly 116. The landing gear mount cap 153 can be attached to the draft arm 116 (i.e., the draft arm tube extrusion 154) above the landing gear mount flange extrusion 152 to support the body 102. The landing gear cap extrusion 153 includes a top plate 2602 and a pair of parallel side walls 2604 extending perpendicularly from the ends of the top plate to form a rectangular socket 2608. A stop member 2610 can be provided on the inner surface of each side wall 2604. The socket 2608 can receive a draft arm tube extrusion 154, but only up to the level of the stop members 2610, thereby causing the landing gear cap 153 to extend above the draft arm tube. The landing gear cap extrusion 153 can be permanently connected to the modular draft arm tube 154 and other components by drilling holes 182 (denoted by dashed lines) through the side walls 2604 and the underlying draft arm tube and then inserting and fastening mechanical fasteners 160 and/or 162 including, but not limited to, bolts and rivets. The configuration of the landing gear mount cap 153 connected to a draft arm tube 154 and landing gear mount flange 152 to form a landing gear subassembly is shown in FIG. 29.

Referring now to FIG. 27, there are illustrated portions of an exemplary modular floor 127 to show connection of the various modular components including the floor crossmember extrusion 128, floor plates 130, floor crossmember subfloor variant extrusion 132 and rear apron (sill) extrusion 134. For purposes of illustration, the positions of the holes 182 and fasteners 162 connecting the components are denoted by dashed lines. In the illustrated embodiment, the bottom plate 2004 of the rear apron 134 includes a dog-leg that allows the front portion of the bottom plate to be in line (denoted by dashed line) with the flanges 1412 of the floor crossmember subframe variant 132. This provides a level surface for attachment of components for the modular subframe 104 to the bottom of the modular floor 127.

Referring now to FIG. 28, there is illustrated an exemplary modular headboard 141 to show connection of the various modular components including the bottom headboard rail extrusion 138, side spacer extrusions 124', 124" and 124''' and the top headboard rail extrusion 140.

Referring now to FIG. 29, there are illustrated portions of an exemplary modular landing gear mounting assembly to show connection of the various modular components including the draft arm tube extrusion 154, landing gear mount flange extrusions 152 and landing gear cap extrusion 153. For purposes of illustration, the positions of the holes 182 and fasteners 162 connecting the components are denoted by dashed lines.

Referring now to FIG. 30, there are illustrated portions of an exemplary modular tailgate assembly 118 to show connection of certain modular components including the tailgate frame extrusion 150 and tailgate pin housing extrusions 156. For purposes of illustration, the positions of the holes 182 and fasteners 162 connecting the components are denoted by dashed lines. The hinges 165 for the modular tailgate 118 also key (i.e., interfit) into the recess 2210 of the tailgate frame extrusion 150 similar to the tailgate pin housing extrusion 156.

Figure 31:
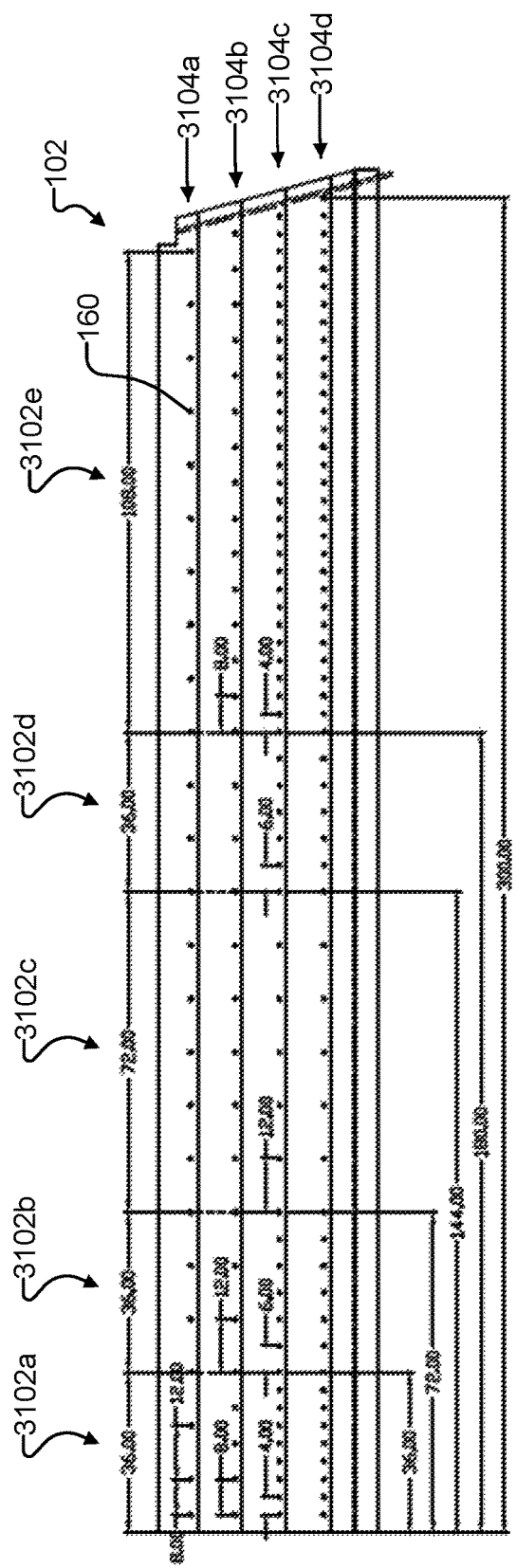
FIG. 31 is a schematic side view of a modular body sidewall showing an exemplary pattern for the locations of the wall fasteners connecting the modular wall components to optimize shear loads/stresses in the sidewall.

Referring now to FIG. 31, there is illustrated a body side wall 121 showing an exemplary pattern 3100 for the locations of the wall fasteners 160 connecting the modular side wall components 122, 124 and 126 to optimize shear loads/stresses in the sidewall for all load conditions, i.e., with both axles on the ground (highway mode) or with the rear axle only on the ground (dumping mode). The pattern 3100 divides the body side wall 121 into a plurality of longitudinal zones 3102, for example, zones 3102a, 3102b, 3102c, 3102d and 3102e, and considers the spacing of the fasteners 160 along each boundary 3104 between wall components, for example, boundary 3104a, 3104b, 3104c and 3104d. The longitudinal spacing of the fasteners 160 within a particular zone 3102(x) along a particular boundary 3104(y) is substantially constant, however, the longitudinal spacing of the fasteners can be different for different zones along the same boundary, or for different boundaries within the same zone.

Referring now to FIG. 35, there is illustrated a (rear) portion of an exemplary modular floor 127 connected to an exemplary modular subframe 104. The illustrated modular subframe 104 includes a first subframe layer 3502 and a second subframe layer 3504. The first subframe layer 3502 comprises a plurality of longitudinally-oriented subframe extrusions 136' connected to the modular floor 127 using mechanical fasteners 162'. The second subframe layer 3504 comprises a plurality of transversely-oriented subframe extrusions 136" connected to the underside of the first subframe layer 3502 using mechanical fasteners 162". In the illustrated embodiment, the subframe extrusions 136" of the second layer 3504 are inverted relative to those of the first layer 3502. The running gear, e.g., axles 106, suspension links 107 and air springs 109, can be attached to the underside of the second subframe layer 3504 using mechanical fasteners 162'''. The fasteners 162', 162" and 162''' can be bolts, rivets or other types of mechanical fasteners, and the fasteners on each layer can be of the same type or different types, depending on the type of connection required.

Figure 32:
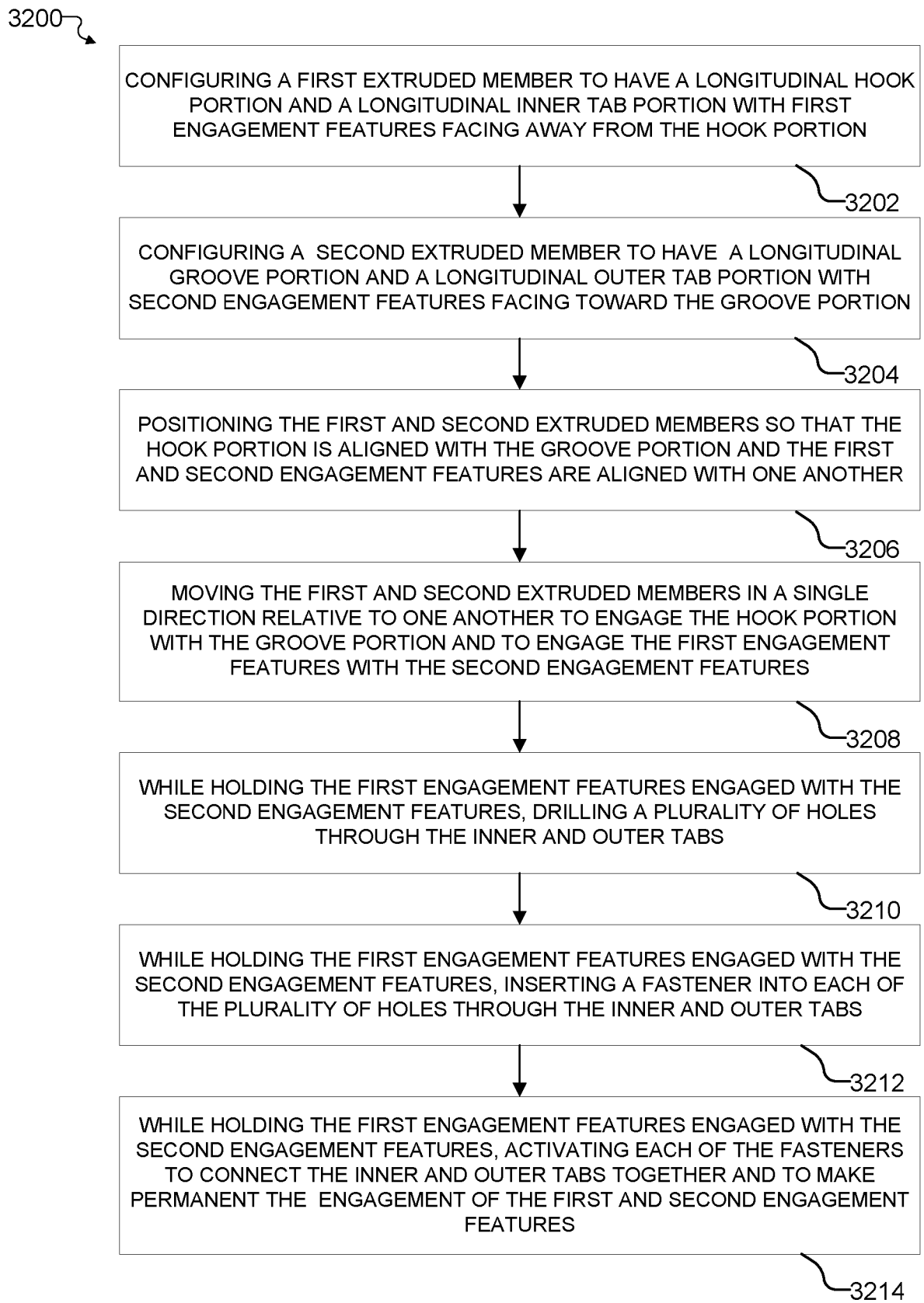
FIGS. 32 and 33 illustrate exemplary methods for connecting modular components according to embodiments of the present disclosure.

Referring now to FIG. 32, an exemplary method 3200 for connecting two modular components without welding is provided according to embodiments of the present disclosure. For example, the method can be performed during fabrication of a dump trailer body from tempered aluminum modular components. See also, FIGS. 7A-7L.

In operation 3202, a first extruded member is configured to have a longitudinal hook portion and a longitudinal inner tab portion with first engagement features facing away from the hook portion.

In operation 3204, a second extruded member is configured to have a longitudinal groove portion and a longitudinal outer tab portion with second engagement features facing toward the groove portion.

In operation 3206, the first and second extruded members are positioned so that the hook portion is aligned with the groove portion and the first and second engagement features are aligned with one another.

In operation 3208, the first and second extruded members are moved in a single direction relative to one another to engage the hook portion with the groove portion and to engage the first engagement features with the second engagement features.

In operation 3210, while holding the first engagement features engaged with the second engagement features, a plurality of holes are drilled through the inner and outer tabs.

In operation 3212, while holding the first engagement features engaged with the second engagement features, a fastener is inserted into each of the plurality of holes through the inner and outer tabs.

In operation 3204, while holding the first engagement features engaged with the second engagement features, each of the fasteners is activated to connect the inner and outer tabs together and to make permanent the engagement of the first and second engagement features. In this context, the term "activating" or "activated" with respect to a fastener means performing the necessary operation to cause the fastener to perform its ordinary fastening task. For example, activating a bolt includes attaching and tightening a corresponding nut; activating a rivet includes expanding/setting the rivet; etc.

In contrast to conventional welding connection methods, which require heating tempered aluminum components to the point that the temper is adversely affected, the method 3200 allows connection of tempered aluminum modular components without heating, and thus without loss of temper in the aluminum.

Figure 33:
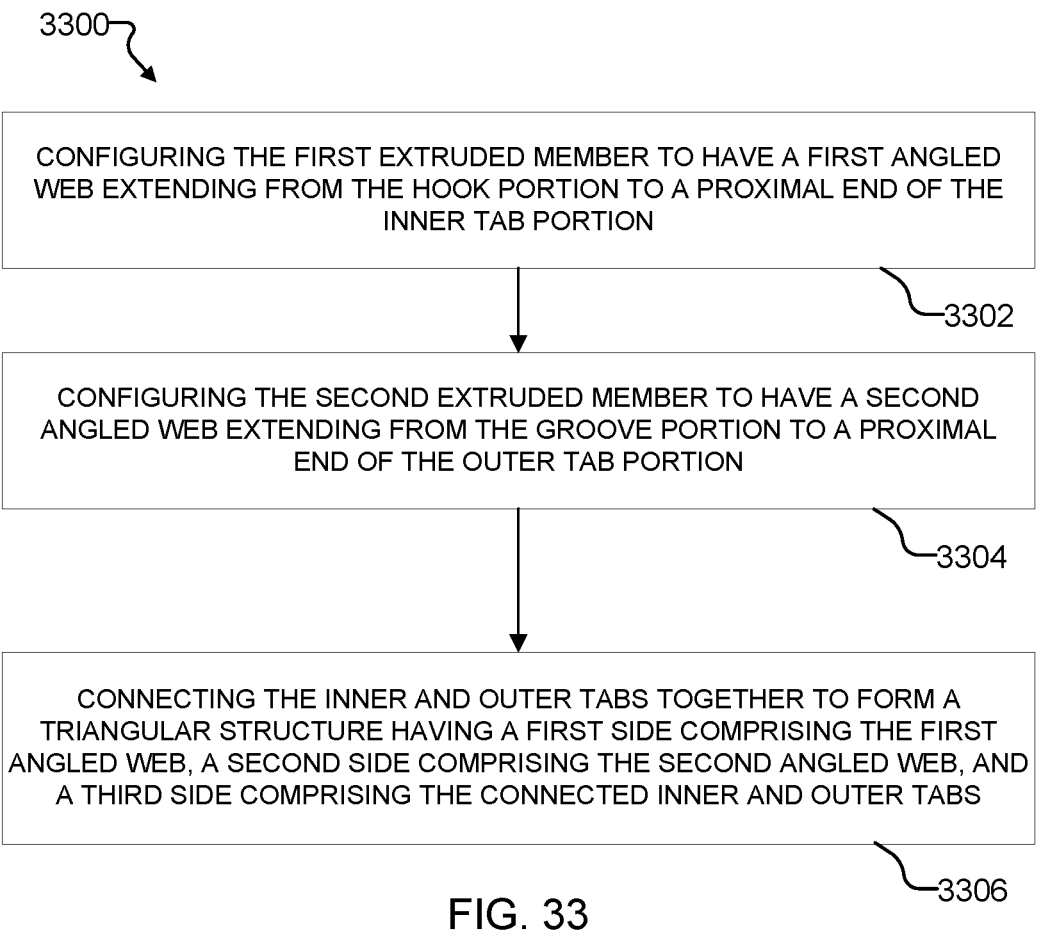

Referring now to FIG. 33, a method 3300 for connecting modular component to produce a triangular joint is provided. For example, the method can be performed as additional operations during the method 3200 of FIG. 32. See also, FIGS. 7A-7L, in particular, FIG. 7F.

In operation 3302, the first extruded member is configured to have a first angled wall extending from the hook portion to a proximal end of the inner tab portion. In some embodiments, this operation is a further portion of previously described operation 3202.

In operation 3304, the second extruded member is configured to have a second angled wall extending from the groove portion to a proximal end of the outer tab portion. In some embodiments, this operation is a further portion of previously described operation 3204.

In operation 3306, the inner and outer tabs are connected together to form a triangular structure having a first side comprising the first angled wall, a second side comprising the second angled wall, and a third side comprising the connected inner and outer tabs ion. In some embodiments, this operation is a further portion of previously described operation 3214.

A trailer body 102 can occasionally be damaged in use, e.g., due to operational accidents or by other causes. It is important during repair (as it was during fabrication) to avoid heating the trailer body 102 or modular components made of tempered aluminum to temperatures that would result in loss of temper and loss of structural strength. Accordingly, repair operations that do not require welding are necessary. Although during normal use the modular components of the trailer body 102 are permanently connected to one another, the modular structure still allows removal and replacement of modular components for repair without requiring welding.

Generally speaking, repair of the body 102 is accomplished by removing the bolts, rivets or other mechanical fasteners, disassembling the modular components, replacing the damaged components, reassembling the modular components, and installing new bolts, rivets or other mechanical fasteners. In the case of permanent mechanical fasteners such as rivets, blind rivets, swaged bolts, etc., the fasteners can be drilled out. Drilling will not damage the temper of the tempered aluminum modular components.

Figure 34:
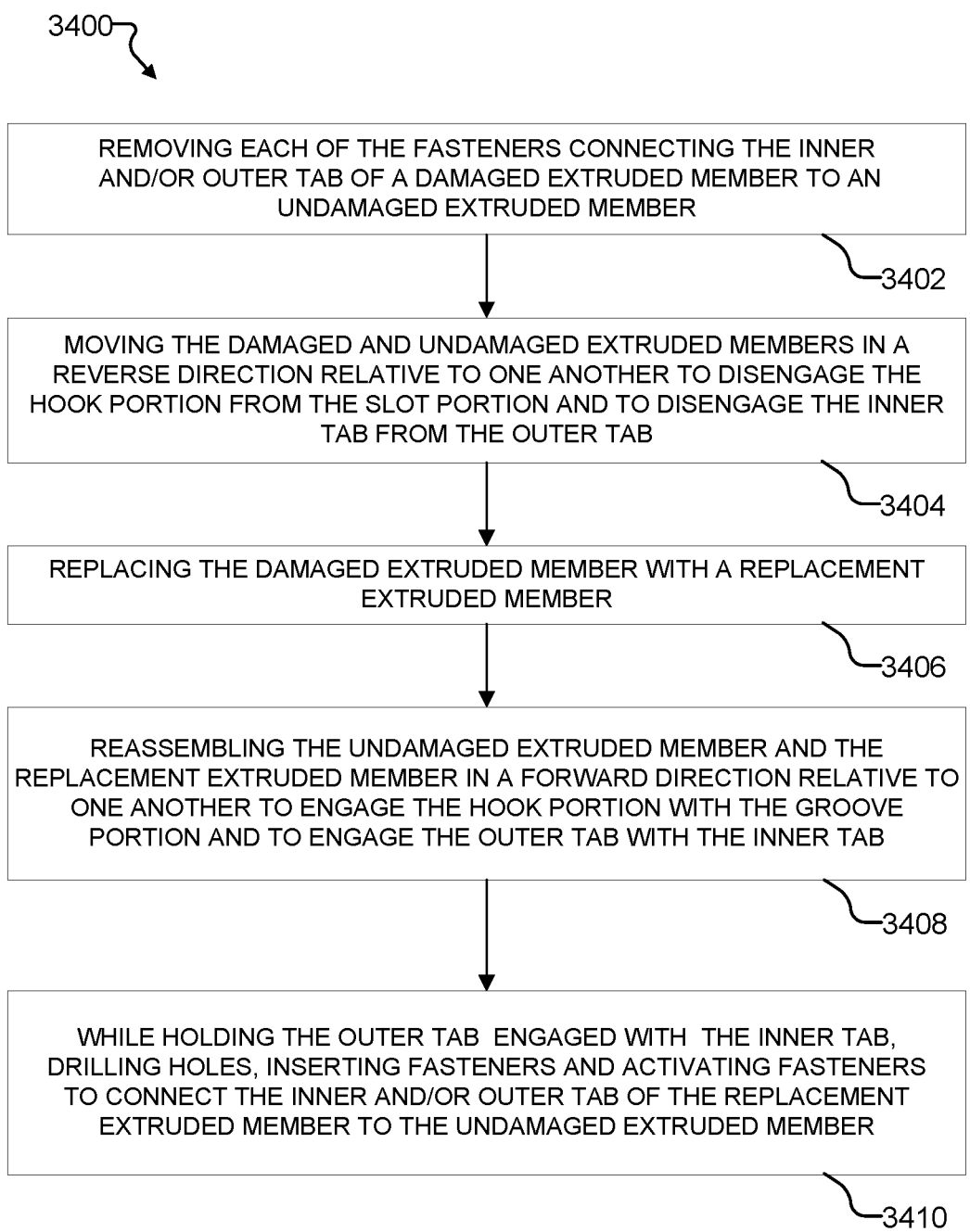
FIG. 34 illustrates an exemplary method for repairing and/or replacing modular components of a modular assembly according to embodiments of the present disclosure.

Referring now to FIG. 34, one an exemplary method 3400 for repair of modular components without welding is provided according to embodiments of the present disclosure.

For example, the method 3400 can be used to remove and replace modular components including, but not limited to, components 122, 124, 126, 138 and 140 having hook and slot portions 170 and 172 and inner and outer tabs 174 and 176 with engagement features 178 and 180.

In operation 3402, each of the fasteners connecting the inner and/or outer tab of a damaged modular extruded member to an undamaged modular extruded member is/are removed.

In operation 3404, the damaged and undamaged modular extruded members are moved in a reverse direction relative to one another to disengage the hook portion from the slot portion and to disengage the first engagement features from the second engagement features. This operation can be essentially the reverse of the operation 3208 of the connection method 3200.

In operation 3406, the damaged modular extruded member is replaced with a replacement modular extruded member.

In operation 3408, the undamaged modular extruded member and the replacement modular extruded member are reassembled (i.e., assembled) in a single direction relative to one another to engage the hook portion with the groove portion and to engage the first engagement features with the second engagement features. This operation can be essentially identical to operation 3208 of the connection method 3200.

In operation 3410, while holding the first engagement features engaged with the second engagement features, holes are drilled through the inner and/or outer tabs of the replacement modular extruded member and/or of the undamaged modular extruded member, fasteners are inserted into the holes, and the inserted fasteners are activated to connect the inner and/or outer tab of the replacement modular extruded member to the undamaged modular extruded member. This operation can be essentially identical to operations 3210, 3212 and 3214 of the connection method 3200.

It will be appreciated by those skilled in the art having the benefit of this disclosure that this end dump trailer and modular extrusions therefor provides a trailer with relatively lower weight and thus relatively higher net capacity, as well as a trailer that is relatively easy to repair. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A dump trailer body comprising:
    a modular sidewall including at least a first side spacer extrusion and a bottom rail extrusion;
    the first side spacer extrusion being a first aluminum alloy extrusion tempered by heat treating and having a first constant cross section along a first extrusion axis, the first constant cross section defining a first outer sidewall, a first inner sidewall, a first bottom wall and a first upper wall joined together to define a first box-like structure;
    wherein a first slot portion and a first outer tab portion are disposed at opposite ends of the first upper wall, and a first hook portion and a first inner tab portion are disposed at opposite ends of the first bottom wall; and
    the bottom rail extrusion being a second aluminum alloy extrusion tempered by heat treating and having a second constant cross section along a second extrusion axis, the second constant cross section defining a second outer sidewall, a second inner sidewall, a second bottom wall and a second upper wall joined together to define second box-like structure;
    wherein a second slot portion and a second outer tab portion are disposed at opposite ends of the second upper wall;
    wherein the first side spacer extrusion is disposed relative to the bottom rail extrusion such that the first hook portion mechanically engages the second slot portion and the first inner tab portion is disposed against the second outer tab portion; and
    at least one first fastener extending through aligned holes passing through the first inner tab portion and the second outer tab portion and mechanically engaging the first inner tab portion to the second outer tab portion.

2. A dump trailer body according to claim 1, wherein the modular sidewall further comprises:
    a second side spacer extrusion;
    wherein the second side spacer extrusion is disposed relative to the first side spacer extrusion such that a first hook portion of the second side spacer extrusion mechanically engages the first slot portion of the first side spacer extrusion and a first inner tab portion of the second side spacer extrusion is disposed against the first outer tab portion of the first side spacer extrusion; and
    at least another first fastener extending through aligned holes passing through the first inner tab portion of the second side spacer extrusion and the first outer tab portion of the first side spacer extrusion and mechanically engaging the first inner tab portion of the second side spacer extrusion to the first outer tab portion of the first side spacer extrusion.

3. A dump trailer body according to claim 2, wherein the modular sidewall further comprises:
    a top rail extrusion being another aluminum alloy extrusion tempered by heat treating and having a top rail constant cross section along a top rail extrusion axis, the top rail constant cross section defining a top rail outer sidewall, a top rail inner sidewall, a top rail bottom wall and a top rail upper wall joined together to form a box-like structure;
    wherein a top rail hook portion and a top rail inner tab portion are disposed at opposite ends of the top rail bottom wall;
    wherein the top rail extrusion is disposed relative to an uppermost side spacer extrusion such that the top rail hook portion mechanically engages a first slot portion of the uppermost side spacer extrusion and the top rail inner tab portion is disposed against a first outer tab portion of the uppermost side spacer extrusion; and
    at least one top rail fastener extending through aligned holes passing through the top rail inner tab portion and the first outer tab portion of the uppermost side spacer extrusion and mechanically engaging the top rail inner tab portion to the first outer tab portion of the uppermost side spacer extrusion.

4. A dump trailer body in accordance with claim 1, wherein:
the first bottom wall is configured to define a first angle, relative to a first perpendicular line from the first outer sidewall, between the first hook portion and the first inner tab portion;
the second upper wall is configured to define a second angle, relative to a second perpendicular line from the second outer sidewall, between the second slot portion and the second outer tab portion; and
a connection of the first inner tab portion and the second outer tab portion forms a triangular joint structure comprising a first wall, a second wall and a third wall; wherein:
the first wall of the triangular joint structure is formed by the engaged first inner tab portion and the second outer tab portion;
the second wall of the triangular joint structure runs between a first end of the first wall and the engaged first hook portion and second slot portion; and
the third wall of the triangular joint structure runs between a second end of the first wall and the engaged first hook portion and the second slot portion.

5. A dump trailer body in accordance with claim 4, wherein:
the first angle of the first bottom wall is in the range from −15 degrees to −8 degrees relative to the first perpendicular line from the first outer sidewall; and
the second angle of the second upper wall is in the range from 15 degrees to 8 degrees, relative to the second perpendicular line from the second outer sidewall.

6. A dump trailer body in accordance with claim 4, wherein a portion of the at least one first fastener extending through the aligned holes in the first inner tab portion and the second outer tab portion extends into an interior portion of the triangular joint structure bounded by the first wall, the second wall and the third wall.

7. A dump trailer body in accordance with claim 1, further comprising:
wherein the first inner tab portion is thicker at a supporting end attached to the first bottom wall and tapers to be thinner at a free end;
wherein the first outer tab portion is thicker at a supporting end attached to the first upper wall and tapers to be thinner at a free end;
engagement features defined on an outer-facing surface of the first inner tab portion and on an inner-facing surface of the first outer tab portion; and
wherein the engagement features are serrations having successive faces angled 90 degrees relative to one another and angled +/−45 degrees relative to a fastener clamping direction.

8. A dump trailer body in accordance with claim 1, further comprising:
wherein the first slot portion of the side spacer extrusion includes a first taper;
wherein the first hook portion of the side spacer extrusion includes a second taper; and
wherein the first and second tapers are configured to provide an increasingly tight fit as the first hook portion moves further into a first slot portion of another side spacer extrusion having an identical profile.

9. A dump trailer body in accordance with claim 1, further comprising:
a modular floor including at least one floor crossmember extrusion and at least one floor plate extrusion;
the floor crossmember extrusion being a third aluminum alloy extrusion tempered by heat treating and having a third constant cross section along a third extrusion axis, the third constant cross section defining an upper plate, a bottom plate and two side plates joined together to define a third box-like structure;
wherein a third slot portion is formed at the junction of each side plate with the upper plate, and a third tab portion extends outwardly from each third slot portion; and
the floor plate extrusion being a fourth aluminum alloy extrusion tempered by heat treating and having a fourth constant cross section along a fourth extrusion axis, the fourth constant cross section defining a central plate and a pair of fourth hook portions disposed on lateral ends of the central plate;
wherein the floor plate extrusion is disposed relative to the floor crossmember extrusion such that at least one of the fourth hook portions mechanically engages at least one of the third slot portions and at least a portion of the central plate overlies at least one of the third tab portions; and
at least one second fastener extending through aligned holes passing through the overlying portion of the central plate and the third tab portion and mechanically engaging the floor plate extrusion to the floor crossmember extrusion; and
wherein the bottom rail extrusion further comprises a sidewall tab portion extending from the second bottom wall; and
wherein the modular floor is disposed relative to the bottom rail extrusion such that the sidewall tab portion overlies at least a portion of the modular floor; and
at least one third fastener extending through aligned holes passing through the overlying sidewall tab portion and the modular floor and mechanically engaging the modular floor to the modular sidewall.

10. A dump trailer body in accordance with claim 9, wherein the bottom rail extrusion further comprises:
a fillet portion extending down and inward at an obtuse angle from an upper portion of the second inner sidewall to a distal end; and
a fillet tab portion connected to the distal end of the fillet portion, and extending in line with the sidewall tab portion;
wherein the modular floor is disposed relative to the bottom rail extrusion such that the fillet portion and the fillet tab portion overlie at least a portion of the modular floor; and
at least one fourth fastener extending through aligned holes passing through the overlying fillet tab portion and the modular floor and mechanically engaging the fillet tab portion to the modular floor;
whereby the fillet portion defines an obtuse angle between the modular sidewall and the modular floor on an interior surface of the dump trailer body when viewed along a centerline of the trailer body.

11. A dump trailer body in accordance with claim 9, wherein:
the floor plate extrusion has a thickness of d; and
the third tab portions of the floor crossmember extrusion extend substantially parallel to the upper plate, but are displaced downward by a distance d;
whereby the modular floor has a flush upper surface.

12. A dump trailer body in accordance with claim 9, wherein the third box-like structure of the floor crossmember extrusion has a trapezoidal cross-section viewed along the third extrusion axis.

13. A dump trailer body in accordance with claim 9, wherein the modular floor further comprises:
   a plurality of spaced-apart floor crossmember extrusions arranged perpendicular to a centerline of the trailer body;
   a plurality of floor plate extrusions arranged parallel to the floor crossmember extrusions; and
   a rear sill extrusion disposed at a rear end of the trailer body floor and arranged parallel to the floor crossmember extrusions;
   the rear sill extrusion being a fifth aluminum alloy extrusion tempered by heat treating and having a fifth constant cross section along a fifth extrusion axis, the fifth constant cross section defining a sill upper plate, a sill bottom plate, a sill rear wall and a sill front wall joined together to define a fifth box-like structure;
   wherein a fifth slot portion is formed at a junction of the sill upper plate and the sill front wall and a fifth tab portion extends outwardly from the fifth slot portion; and
   wherein one of the floor plate extrusions is disposed between each adjacent pair of the floor crossmember extrusions, and the fourth hook portions of the floor plate extrusions mechanically engage the respective slot portions the adjacent of the pair of floor crossmember extrusions, and
   wherein a rearmost one of the floor plate extrusion is disposed between the rear sill extrusion and a rearmost one of the floor crossmember extrusion, and the fourth hook portions of the rearmost floor plate extrusion mechanically engage the respective slot portions of the rear sill extrusion and the rearmost floor crossmember extrusion.

14. A dump trailer body in accordance with claim 13, wherein a portion of the floor crossmember extrusions in the modular floor are floor crossmember subframe variant extrusions further comprising flanges extending outwardly from each end of a bottom plate.

15. A dump trailer body in accordance with claim 13, further comprising:
   a modular subframe including a plurality of subframe extrusions and a plurality of floor crossmember extrusions;
   the floor crossmember extrusions of the subframe being a sixth aluminum alloy extrusion tempered by heat treating and having a sixth constant cross section along a sixth extrusion axis, the sixth constant cross section defining an upper plate and a pair of downlegs joined to the upper plate to form an inverted-V structure;
   wherein the plurality of floor crossmember extrusions are arranged longitudinally and disposed beneath a portion of the modular floor to form a first subframe layer;
   wherein the plurality of floor crossmember extrusions of the subframe are arranged transversely and disposed beneath a portion of the first subframe layer to form a second subframe layer; and
   wherein the first and second subframe layers are connected to the modular floor and to one another using mechanical fasteners.

16. A dump trailer body in accordance with claim 9, wherein the modular sidewall is connected to respective first lateral ends of the at least one floor crossmember extrusion and at least one floor plate extrusion, and the trailer body further comprises:
   a second modular sidewall connected to respective second lateral ends of the at least one floor crossmember extrusion and at least one floor plate extrusion; and
   wherein the connection of the second modular sidewall to the respective second lateral ends of the at least one floor crossmember extrusion and at least one floor plate extrusion is formed with mechanical fasteners.

17. A dump trailer body in accordance with claim 16, further comprising:
   a modular headboard connected to the modular sidewall, the modular floor and the second modular sidewall; and
   wherein the connections of the modular headboard to the modular sidewall, the modular floor and the second modular sidewall are formed with mechanical fasteners.

* * * * *